US005547065A

United States Patent [19]
Watanabe et al.

[11] Patent Number: 5,547,065

[45] Date of Patent: Aug. 20, 1996

[54] MULTI-WIRE FEEDING APPARATUS

[75] Inventors: Souichi Watanabe, Yokohama; Kazuaki Kamei, Yamato, both of Japan

[73] Assignee: Molex Incorporated, Lisle, Ill.

[21] Appl. No.: 339,848

[22] Filed: Nov. 15, 1994

[30] Foreign Application Priority Data

Nov. 30, 1993 [JP] Japan .................................... 5-326063

[51] Int. Cl.$^{6}$ .................................................... B65G 15/14

[52] U.S. Cl. ........................................ 198/604; 198/626.1

[58] Field of Search .................................... 198/604, 606, 198/620, 626.1, 626.2

[56] References Cited

U.S. PATENT DOCUMENTS

| | | | |
|---|---|---|---|
| 2,533,335 | 12/1950 | Wallace | 198/626.2 X |
| 3,853,016 | 12/1974 | Lane, III et al. | 198/604 X |
| 3,880,274 | 4/1975 | Bechtloff et al. | 198/604 X |
| 4,879,934 | 11/1989 | Adlon et al. | 83/76.9 |
| 5,082,100 | 1/1992 | Guyonneau | 198/626.1 X |
| 5,343,605 | 9/1994 | Nazerian et al. | 29/33 |
| 5,402,693 | 4/1995 | Hoffa | 81/9.51 |

*Primary Examiner*—James R. Bidwell
*Attorney, Agent, or Firm*—Charles S. Cohen

[57] ABSTRACT

Disclosed is a multi-wire feeding apparatus comprising a plurality of wire feeding units arranged side by side in parallel. Each unit uses an endless belt having projections thereon and a gear wheel having projections to engage those of the endless belt for driving the endless belt and feeding a length of wire thereon. Transmission axles for transmitting driving power to associated gear wheels are arranged so that these gear wheels do not interfere with each other.

21 Claims, 23 Drawing Sheets

MULTI-WIRE FEEDING APPARATUS

FIELD OF THE INVENTION

The present invention relates to a multi-wire feeding apparatus which is designed to control the feeding lengths of wires from the wire rolls, thereby providing a plurality of wires of different desired lengths. Such multi-wire feeding apparatus may be used to provide electric connector harnesses each having parallel arrangement of different wire lengths fixed to electric connectors at their opposite ends.

PRIOR ART

FIG. 26 shows a conventional multi-wire measuring apparatus using a roll-feeder mechanism. It comprises a single feeding roll 1', a numerical control drive motor 2' to rotate the single feeding roll 1' and pressure rolls 3', 4', 5'. . . equal to as many wires as are to be fed and measured W1, W2, W3 .... In operation, a plurality of wires are pinched between the single feeding roll 1' and their respective pressure rolls 3', 4', 5'. A length of wire W1 is fed over a distance L1 measured from the reference position N to an exact wire length L1 by rotating the motor 2' for t1; a length of wire W2 is fed over a distance L2 measured from the reference position N to an exact wire length L2 by rotating the motor 2' for t2; and a length of wire W3 is fed over a distance L3 measured from the reference position N to an exact wire length L3 by rotating the motor 2' for t3. The wire-feeding distance is determined from the rotation angle or number per unit time. After permitting the wire W1 to run a predetermined distance L1 the associated pinch roll 3' is released, and at the same time the motor 2' is made to stop. It takes a short time Δt1 for the motor 2' to stop. Then, the motor 2' starts to rotate for t2, thereby permitting the wire W2 to run a total length L2 measured from the reference position N. Then, the associated pinch roll 4' is released, and at the same time, the motor 2' is made to stop. It takes a short time t2 for the motor 2' to stop. Then the motor 2' starts to rotate for t3, thereby permitting the wire W3 to run a total length L3 measured from the reference position N. Thus, a wire length L3 is measured. This is repeated until the longest wire length is measured. In this particular example it takes t1+Δt1+t2 +Δt2 +t3+Δt3 to determine the wire length W3. This prior art is disclosed in Japanese Patent Application Publication No. 59-42923.

As may be understood, the time required for driving the motor in measuring a desired length of wire is equal to the summation of times for driving the motor in measuring one or more shorter wire lengths plus the pauses subsequent to the measuring such shorter wire lengths. For instance, the time T required for measuring a longest wire length W3 is equal to summation of t1+t2+t3+Δt1+Δt2. Therefore, there has been an increasing demand for substantially shortening the measuring time in case of determining a plurality of different wire lengths, that is, for increasing the number of different wire measurements per unit time.

In the hope of meeting such demand it was proposed that a feeding roll and an associated motor are allotted to each of different wire lengths to be measured. Assuming that the previously described wire-measuring apparatus is modified according to such proposal, there must then be a first feeding roll and associated motor allotted to a wire length W1 to be measured; a second feeding roll and associated motor allotted to a wire length W2 to be measured; and a third feeding roll and associated motor allotted to a wire length W3 to be measured. Additionally, each feeding roll is combined with a counter-pinch roll, and all motors are designed to be driven independently. With the so modified arrangement, the pauses Δt1 and Δt2 can be eliminated, and accordingly the time required for measuring a plurality of different wire lengths can be reduced substantially. In this modification, however, all feeding rolls are arranged on a common axis and therefore, each of the associated motors must be located between adjacent feeding rolls. In the arrangement as shown in FIG. 26, a motor would be placed between the feeding roll for the wire length W1 and the feeding roll for the wire length W2, and another motor would be placed between the feeding roll for the wire length W2 and the feeding roll for the wire length W3. Accordingly, the wire-to-wire interval P will increase. Disadvantageously this requires extra lateral space. In the alternative, the motors could be positioned along the axis of the wires, but this would also require additional space.

SUMMARY OF THE INVENTION

One object of the present invention is to provide a wire measuring apparatus which can measure different wire lengths in the shortest possible time without increasing the lateral space of the whole apparatus.

To attain this object, a multi-wire measuring apparatus comprising a plurality of wire measuring units is provided. Each has an endless belt having teeth-like projections and running or reeved around a plurality of pulleys, a numerical control or servo motor having a gear wheel fixed to its shaft to engage with the teeth-like projections of the endless belt, and means to apply a selected wire to the endless belt, thereby permitting the feeding of a desired length of wire by controlling the rotation of the numerical control motor. The plurality of wire measuring units are arranged side by side at regular intervals with their numerical control motors placed at locations other than in the interspace between adjacent wire measuring units, and with the shafts of the numerical control motors located apart from each other to prevent their pulleys from interfering with each other.

According to one aspect of the present invention the numerical control motors may be spaced apart from each other on one longitudinal side of the lateral arrangement of wire measuring units with their shafts extending across the lateral arrangement of wire measuring units and separating longitudinally apart from each other to prevent the pulleys riding on associated endless belts from interfering with each other.

In use, a number of wires equal to the number of wire measuring units are extended with each wire pinched between the endless belt and the wire-applying means of each wire measuring unit. The associated numerical control motors are driven simultaneously, thus causing all wires to run forward. The numerical control motor associated with the wire measuring unit allotted to the measuring of the shortest wire length is made to stop after a controlled number of rotations, thereby allowing the wire to be extended the shortest distance from the reference position. The other numerical control motors associated with the other wire measuring unit allotted to the measurings of longer wire lengths are allowed to run continuously. The numerical control motor allotted to the measuring of the second shortest wire length is made to stop when the second shortest wire length is allowed to extend from the reference position while the remaining numerical control motors are allowed to run continuously. Finally, the numerical control motor allotted to the measuring of the longest wire length is made to stop when the longest wire length is allowed to extend from the reference position. Thus, a wire measuring cycle is completed. For the wire measuring cycle every numerical control motor is not allowed to stop before completing the measurement of wire length allotted thereto. Therefore, the wire measuring cycle is the shortest possible length of time. Due to the use of endless belts, the numerical control motors can be arranged at arbitrarily selected longitudinal positions as long as their pulleys drive the associated endless belts. Therefore, the numerical control motors are positioned between adjacent wires to be measured, and the space between adjacent endless belts may be minimized.

In an alternate embodiment, a plurality of wire measuring units are arranged side by side at regular intervals to be driven by a single numerical control motor having a plurality of transmission axles connected to its drive shaft. Clutches and brakes are positioned at places other than in the space between adjacent wire measuring units, and with the transmission axles placed longitudinally apart from each other to prevent their pulleys from interfering with each other.

The clutches and brakes may be placed on one longitudinal side of the lateral arrangement of wire measuring units with the transmission axles extending across the lateral arrangement of wire measuring units, thereby permitting the pulleys fixed to the ends of the transmission axles to ride on associated endless belts.

In use, as many wires as wire measuring units are extended with each wire pinched between the endless belt and the wire-applying means of each wire measuring unit. The numerical control motor is driven and simultaneously, all clutches are actuated to connect all transmission axles to the shaft of the numerical control motor, thus causing all wires to run forward. The clutch of the transmission axle associated with the endless belt of the wire measuring unit allotted to the measuring of the shortest wire length is released to disconnect the transmission axle from the shaft of the numerical control motor after a controlled number of rotation, thereby allowing the wire to be extended the shortest distance from the reference position. The other clutches are not released, allowing the other wire measuring units allotted to the measurings of longer wire lengths to run continuously. The clutch of the transmission axle allotted to the measuring of the second shortest wire length is released to disconnect the transmission axle from the shaft of the numerical control motor when the second shortest wire length is extended from the reference position while the remaining clutches keep associated transmission axles connected to the shaft of the numerical control motor. Finally, the clutch of the transmission axle allotted to the measuring of the longest wire length is released to disconnect the transmission axle from the shaft of the numerical control motor when the longest wire length is extended from the reference position. Thus, a wire measuring cycle is completed. It should be noted that upon releasing each clutch, the brake associated with that transmission axle is applied to immediately stop the feeding of the associated wire. During the wire measuring cycle, the numerical control motor is not allowed to stop before completing all required measurements. Therefore, the wire measuring cycle is the shortest possible length of time. Due to the use of endless belts, the pulleys can be arranged at arbitrarily selected longitudinal positions so far as the pulleys may ride on associated endless belts, thus permitting the arranging of their transmission axles and associated clutches and brakes at such positions that they do not interfere with each other, and do not require positioning of the clutches and brakes between adjacent endless belts. Therefore, the space between adjacent endless belts can be minimized.

A multi-wire feeding apparatus may comprise further curved guide means between selected pulleys to permit the running of the endless belt along a curved path. Also, it may comprise further curved guide means between selected pulleys to permit the running of the endless belt along a curved path, and another curved guide means between selected pulleys to permit the running of the guide endless belt along the curved path.

Each of the endless belts may have a series of teeth-like projections on either side of the longitudinal center groove, and each of the guide endless belts may have a series of teeth-like projections on either side of the longitudinal center groove for engagement with the counter projections of the endless belt. This assures the synchronous driving of the feeding and guide endless belts, thereby assuring the exact measurement of wires.

In the alternative, each of the endless belts may have teeth-like projections on its inside, and a plurality of drive pulleys may be placed inside longitudinally at intervals with their projections engaging with those of the endless belts. This permits the substantial reduction of the whole apparatus size due to the driven pulleys positioned inside.

BRIEF DESCRIPTION OF THE DRAWINGS

Other objects and advantages of the present inventions will be understood from the following description of multi-wire measuring apparatus according to preferred embodiments of the present invention, which are shown in accompanying drawings.

DETAILED DESCRIPTION OF THE PREFERRED EMBODIMENT

Figure 1:
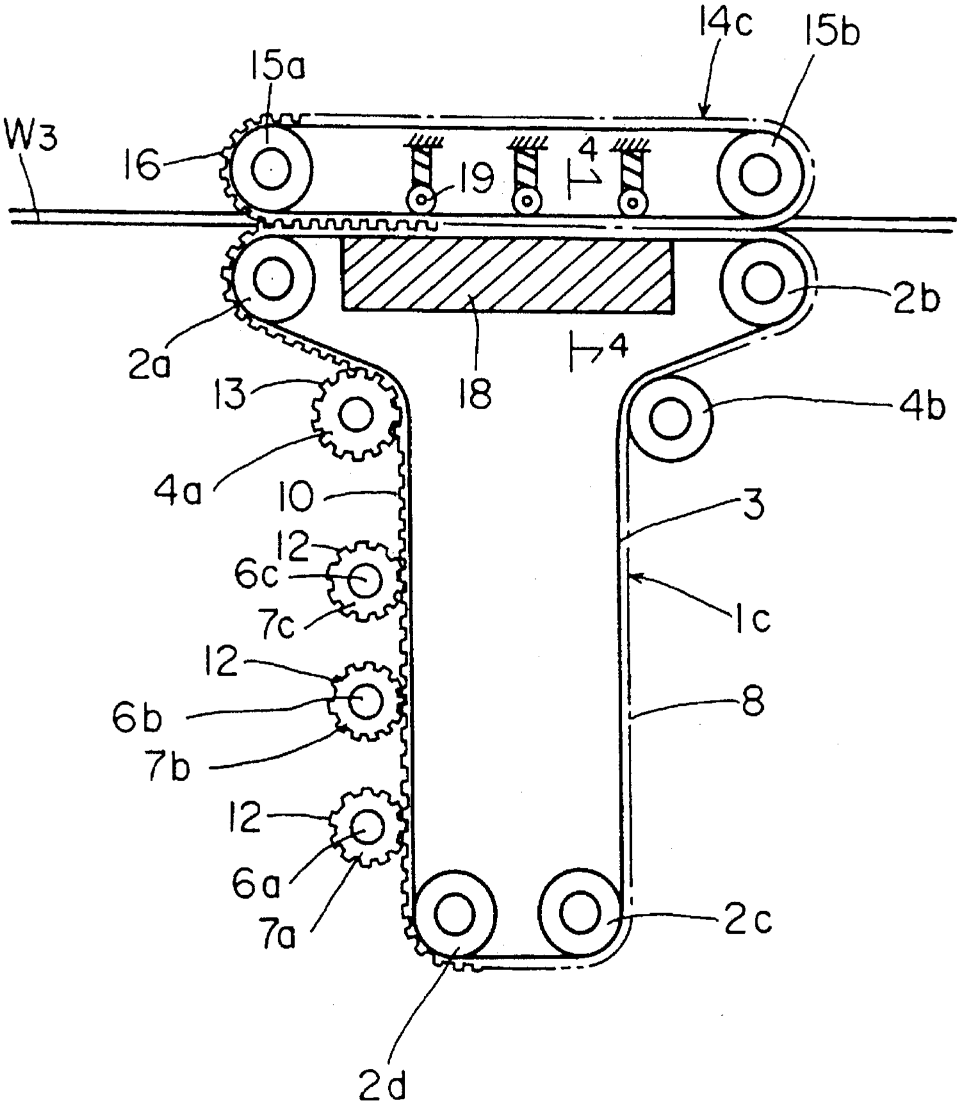
FIG. 1 is a front view of a multi-wire feeding apparatus according to a first embodiment of the present invention.
Figure 2:
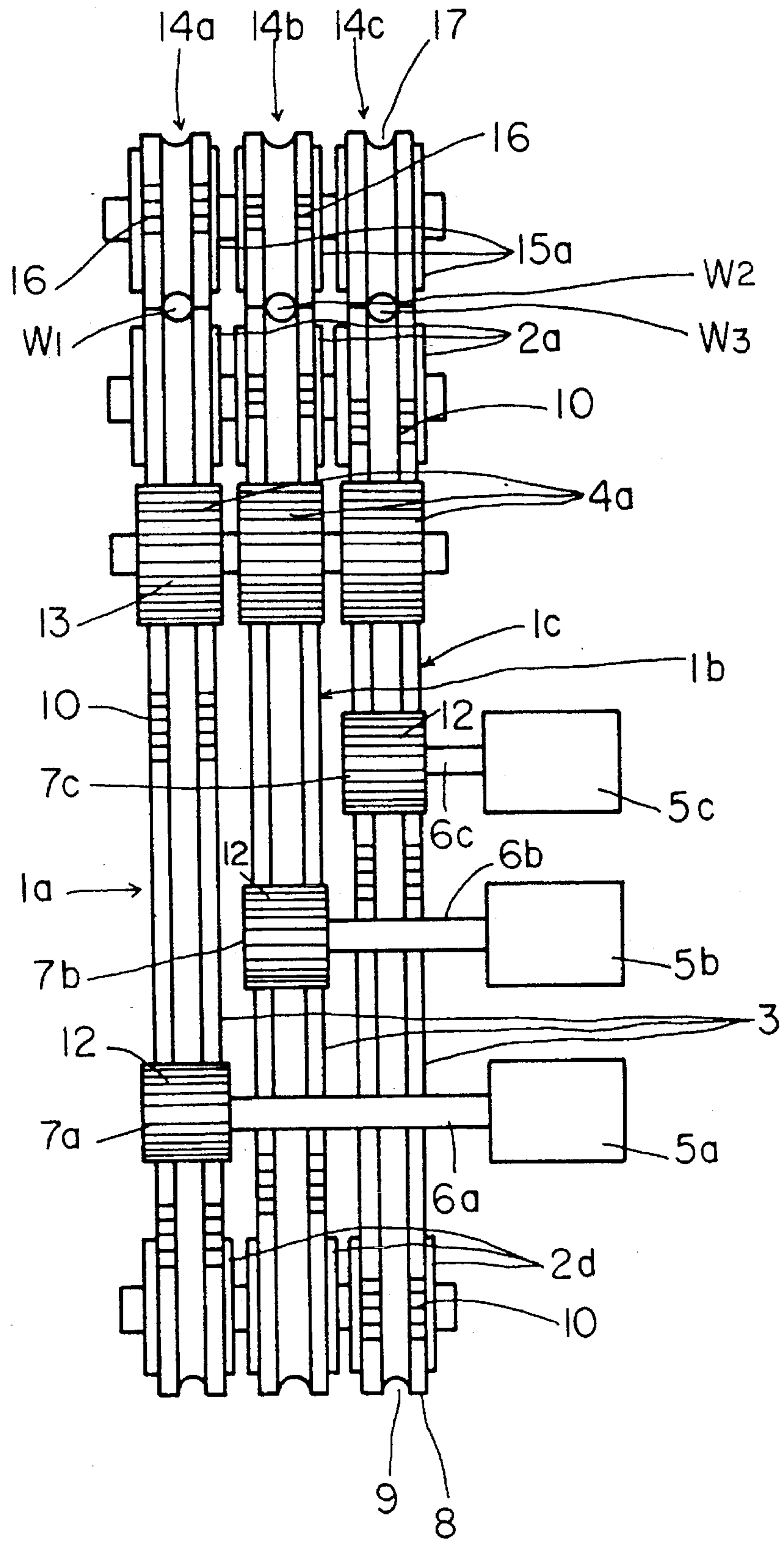
FIG. 2 is a side view of the multi-wire feeding apparatus as viewed from the left side of FIG. 1.
Figure 3:
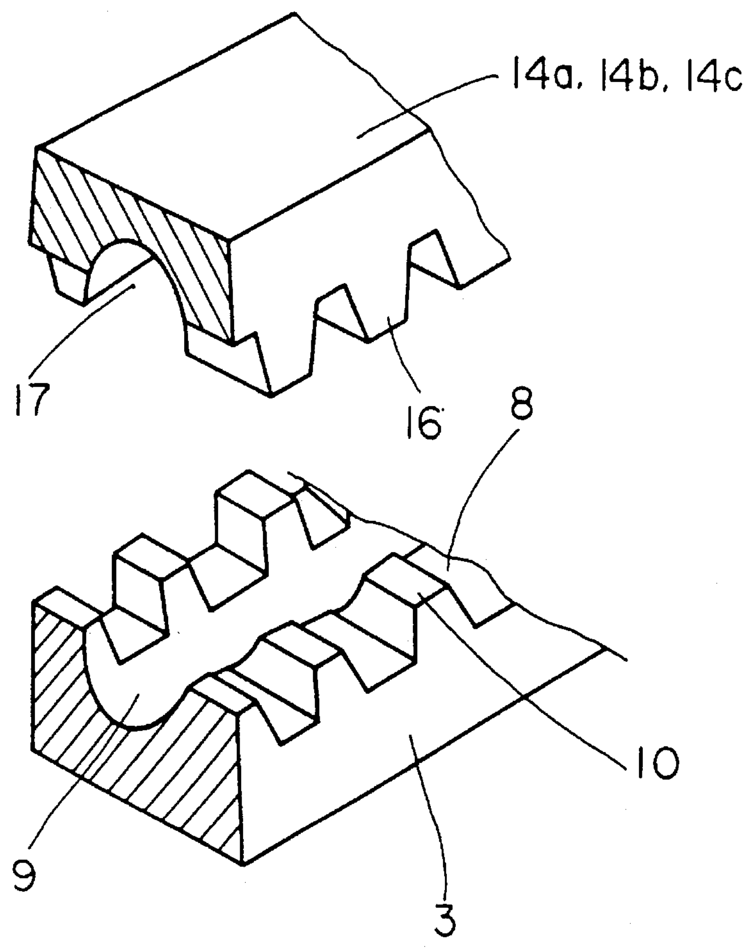
FIG. 3 is a fragmented, perspective view of the endless belt and the guide endless belt.
Figure 4:
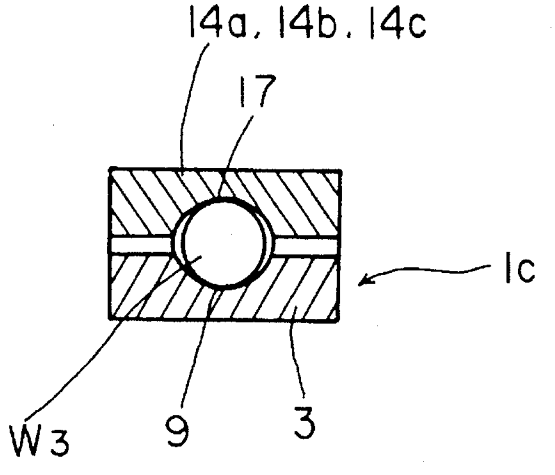
FIG. 4 is a cross-section taken along the line 4—4 in FIG. 1, showing only the endless belt and the guide endless belt sandwiching a wire therebetween.
Figure 5:
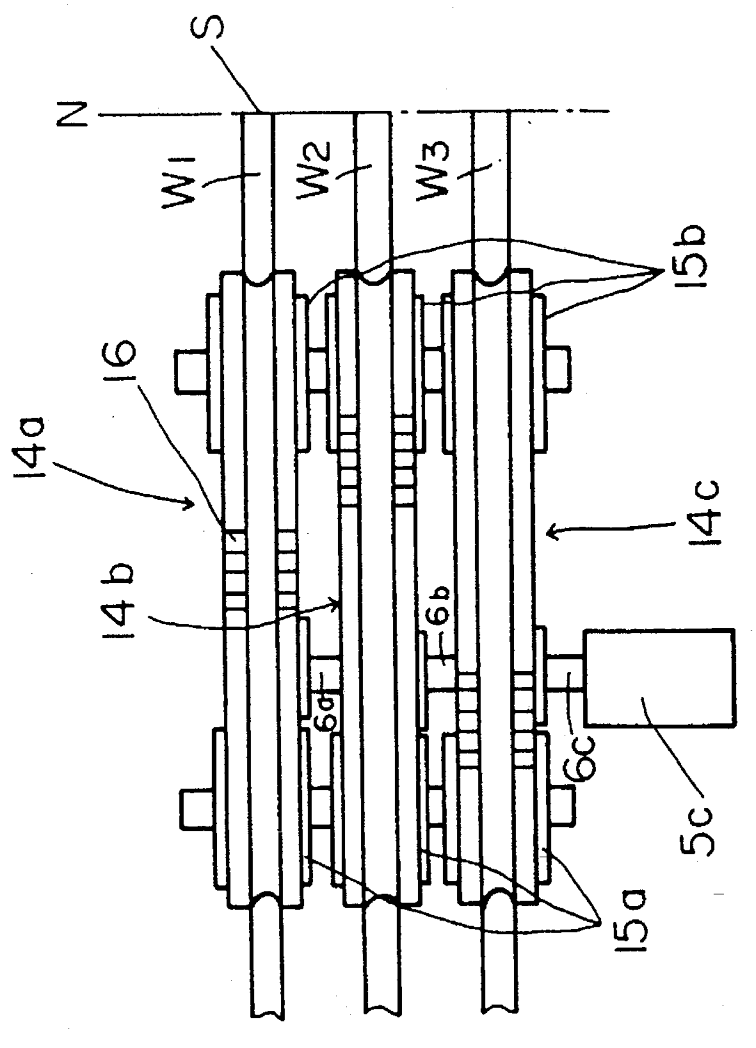
FIG. 5 is a plan view of the multi-wire feeding apparatus, showing how different wire lengths are measured.
Figure 6:
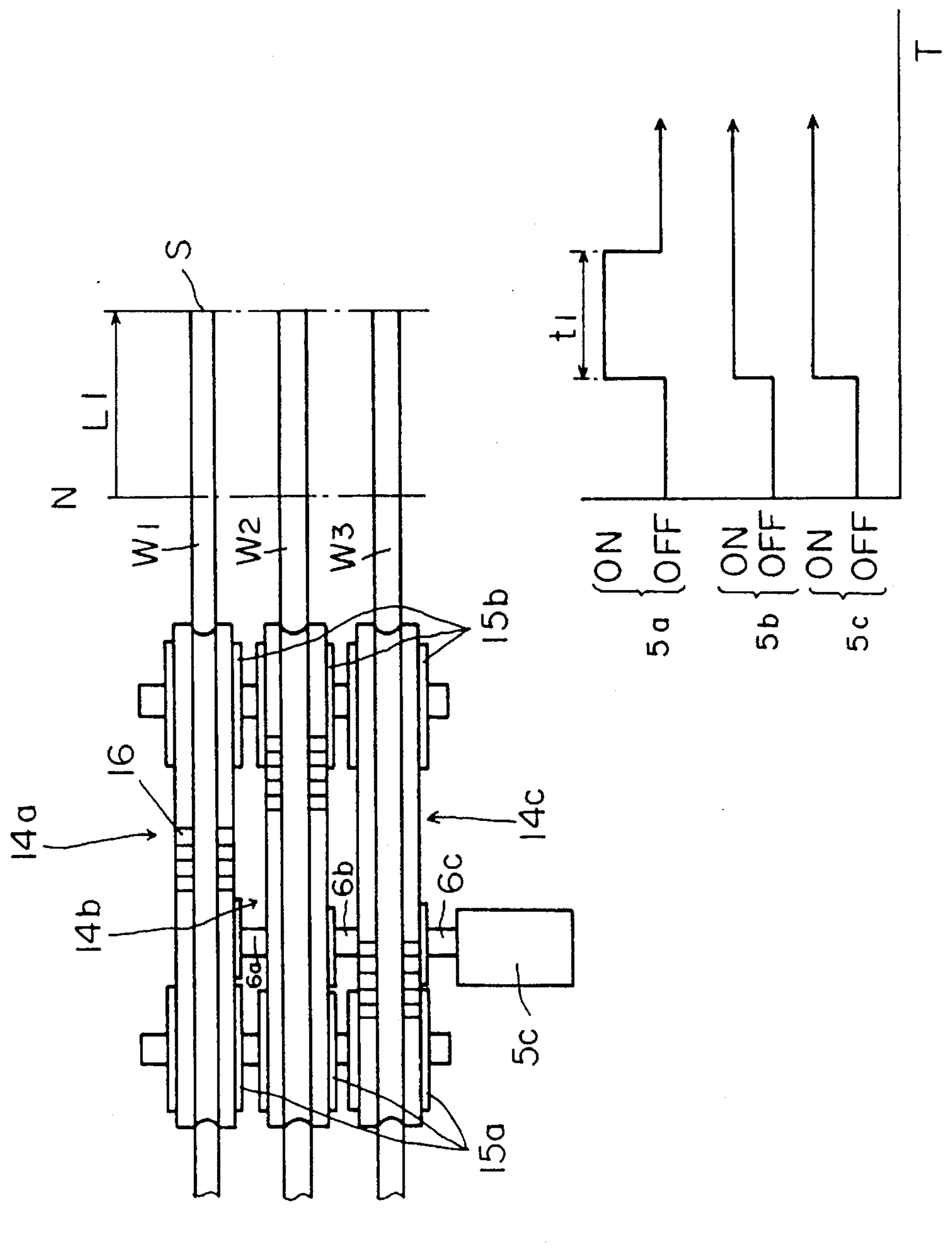
FIG. 6 is another plan view of the multi-wire feeding apparatus similar to FIG. 5, showing how different wire lengths are measured.
Figure 7:
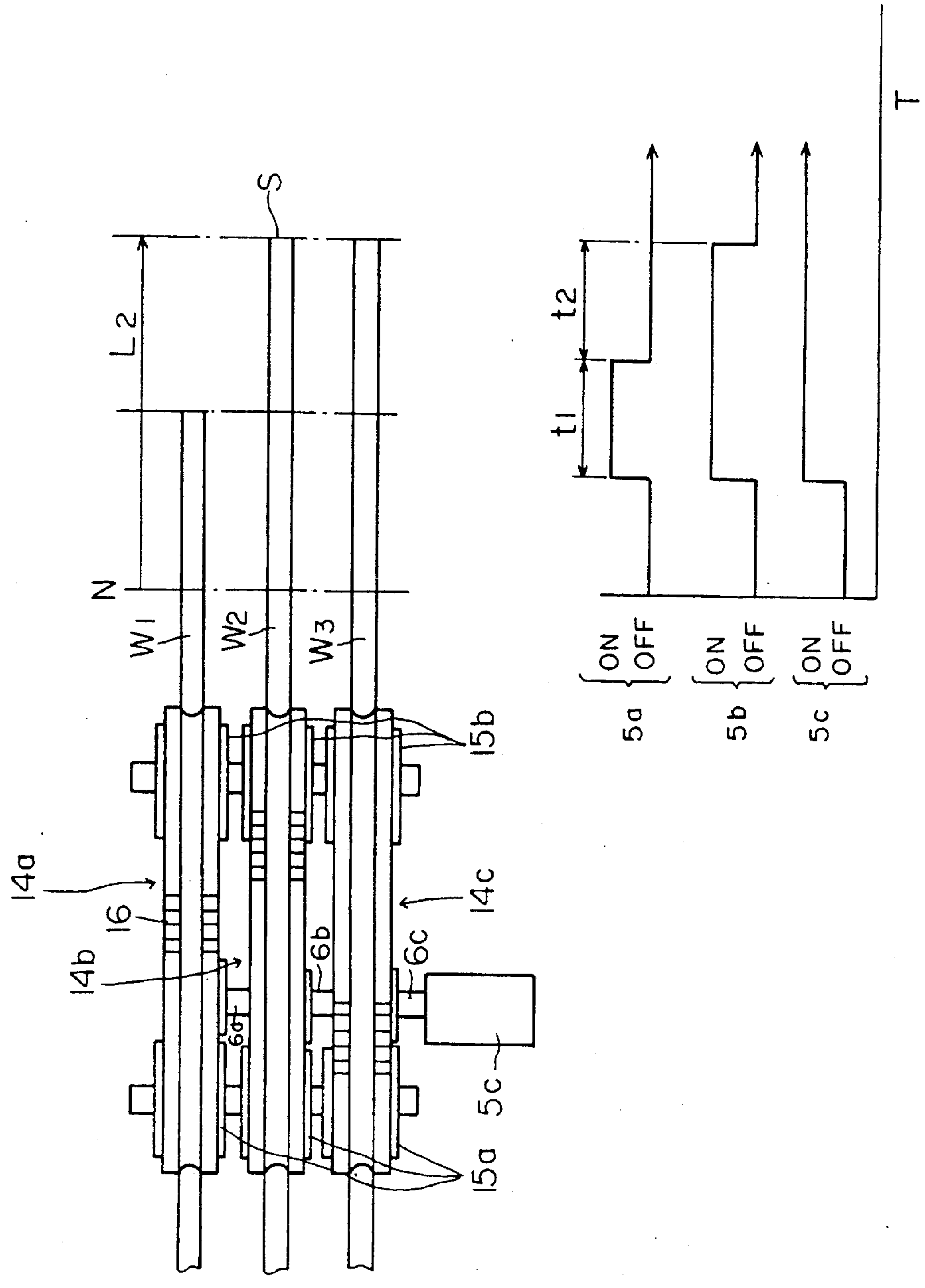
FIG. 7 is still another similar plan view of the apparatus similar to FIG. 5, showing how different wire lengths are measured.
Figure 8:
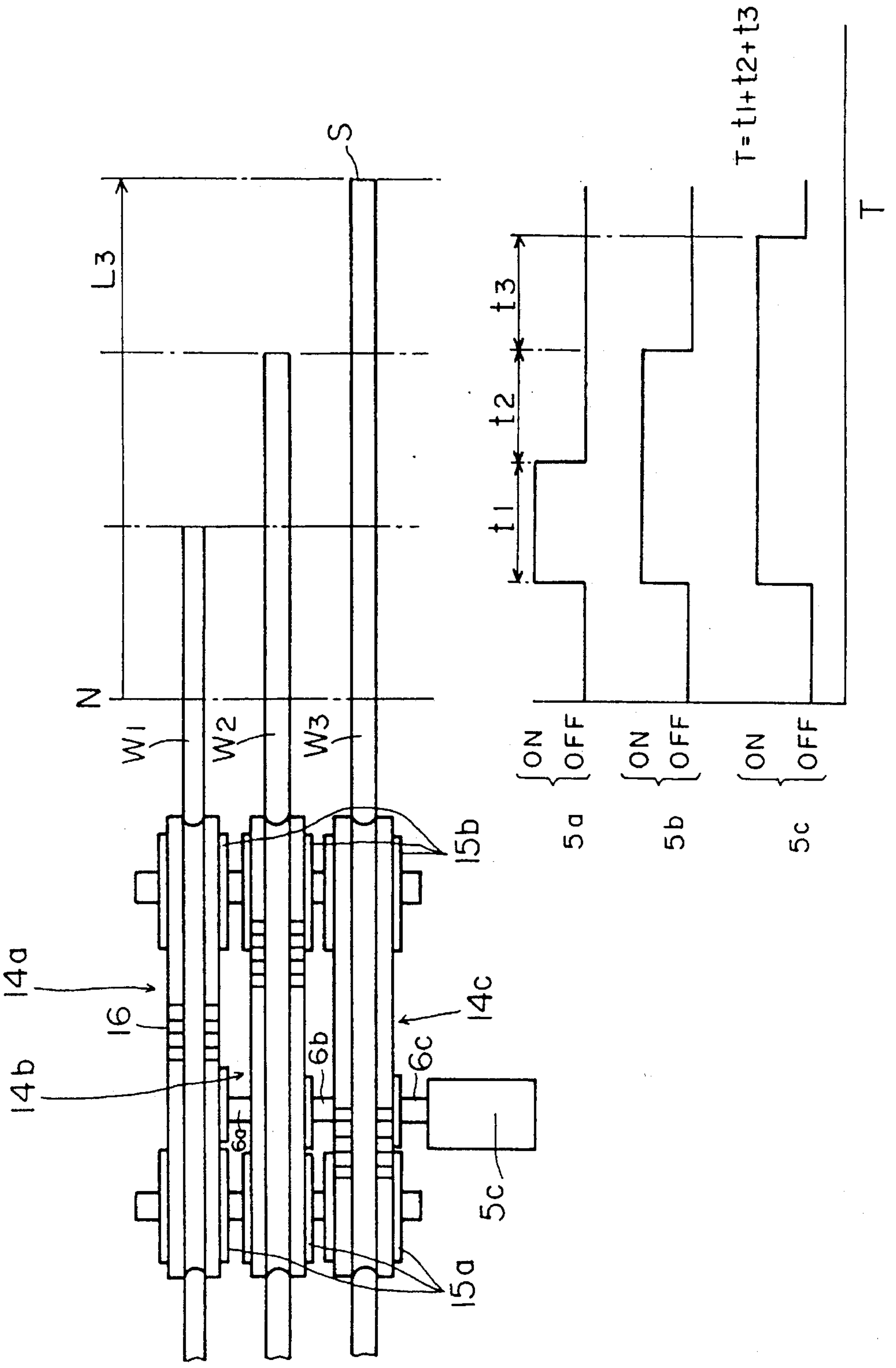
FIG. 8 is still another similar plan view of the apparatus similar to FIG. 5, showing how different wire lengths are measured.

Referring to FIGS. 1 to 8, a multi-wire measuring apparatus according to a first embodiment of the present invention is shown. Such apparatus includes three wire measuring units 1*a*, 1*b* and 1*c* in parallel (FIG. 2). In these drawings, identical parts are indicated by same reference numerals. Idler pulleys 2*a* and 2*b* each allotted to each of wire measuring units 1*a*, 1*b* and 1*c*, are arranged laterally at a relatively large interval, and idler pulleys 2*c* and 2*d*, each allotted to each wire measuring unit, are arranged laterally at a relatively small interval. Endless belts 3, each having teeth-like indentations 10, run around these pulleys 2*a*, 2*b*, 2*c* and 2*d*. Tension pulleys 4*a* and 4*b* push the endless belts 3 inward to provide tension to these belts to ensure no slipping.

Numerical control servo, stepper or other computer controlled motors 5*a*, 5*b* and 5*c*, each having a gear drive wheel 12 fixed to its shaft 6*a*, 6*b* or 6*c*, are longitudinally arranged one above another with their gear wheels 12 engaging with the teeth-like indentations 10 of the endless belts 3. These numerical control motors 5*a*, 5*b* and 5*c* are set for a number of rotations corresponding to different wire lengths to be measured by manually setting them for such preset number of rotations or by so programming them in an associated computer. When such a preset number of rotations is reached, the desired wire length has been fed by the associated numerical control motor.

As is best seen from FIG. 2, the numerical control motors 5*a*, 5*b* and 5*c* are arranged longitudinally one above another along the endless belts 3, and their shafts 6*a*, 6*b* and 6*c* extend across the endless belts 3 so that the gear wheels 7*a*, 7*b* and 7*c* of these shafts 6*a*, 6*b* and 6*c* ride on the associated endless belts 3 with their gear teeth 12 engaging the teeth-like indentations 10 of the underlying endless belts 3 to drive such belts. As is best seen from FIG. 3, each endless belt 3 has an elongated center groove 9 for guiding a wire and two series of teeth-like projections 10 extending on the opposite sides of the center groove 9. Each gear wheel 7*a*, 7*b* or 7*c* has its gear teeth 12 to engage with the teeth-like projections 10 of the endless belt 3 to drive the belt. As may be readily understood, the numerical control motors 5*a*, 5*b* and 5*c* are arranged longitudinally apart from each other so that their gear wheels 7*a*, 7*b* and 7*c* do not interfere with each other. Specifically, the gear wheel 7*a* of the numerical control motor 5*a* is placed at the lowest level, engaging with the left most (as viewed in FIG. 2) endless belt 3; the gear wheel 7*b* of the numerical control motor 5*b* is positioned above the gear wheel 7*a* of the numerical control motor 5*a*, engaging with the middle (as viewed in FIG. 2) endless belt and finally the gear wheel 7*c* of the numerical control motor 5*c* is placed above the gear wheel 7*b* of the numerical control motor 5*b*, engaging with the right most (as viewed in FIG. 2) endless belt 3.

As understood from the above, the use of endless belts provides an advantage of permitting significant flexibility in the placement of associated gear wheels at selected places on the endless belts without causing any adverse effects on the required power transmission from the numerical control motors to the endless belts where such gear wheels may be placed on the endless belts. This provides the liberty of selecting the places at which the gear wheels and motors are placed so as to simplify the design of a machine by reducing technical constraints.

In measuring desired wire lengths, the wire are positioned in the center grooves 9 of the endless belts 3 from idler pulleys 2*a* and 2*b* and sandwiched between the endless belts 3 and oppositely facing, guide endless belts 14*a*, 14*b* and 14*c*, which generally run parallel to the portion of endless belts 3 between idler pulleys 2*a* and 2*b*. The guide endless belts function to push the wires W1, W2 and W3 against the underlying endless belts 3. As is best seen from FIG. 3, each guide endless belt 14*a*, 14*b* or 14*c* has an elongated center groove 17 for guiding a wire and two series of teeth-like projections 16 extending on the opposite sides of the center groove 17. The teeth-like projections 16 of the guide endless belt 14*a*, 14*b* or 14*c* are adapted to engage with the teeth-like projections 10 of the endless belt 3, thus defining a cylindrical space to accommodate the wire as seen from FIG. 4.

As shown in FIG. 1, a linear guide plate 18 extends between the idler pulleys 2*a* and 2*b* to support the endless belts 3. Also, extra push rolls or rollers 19 may be used to push the guide endless belts 14 against endless belts 3 and in turn against the underlying linear guide plate 18.

Such extra push rolls 19 may be spring-biased so as to supply the underlying endless belts 3 with a fixed force.

Referring to FIGS. 5 to 8, the operation of the wire measuring apparatus is described below. These drawings show the guide belts 14*a*, 14*b* and 14*c* as viewed from above. Assume that wires W1, W2 and W3 are laid in the central grooves 9 of the endless belts 3 and the central grooves 17 of the guide endless belts 14*a*, 14*b* and 14*c*, and that the ends S of these wires W1, W2 and W3 are positioned at the reference position N. Alternatively, the wires W1, W2 and W3 may be pulled past the reference position N, and then, all wires cut transversely at the reference position N, thereby putting the ends S of these wires in alignment with the reference position N.

Also, assume that the wire W1 is to be fed for a shortest length L1 by permitting a first numerical control motor 55*a* to run for t1 minutes; the wire W2 is to be fed for a medium length L2 by permitting a second numerical control motor 5*b* to run for t1+t2 minutes; and the wire W3 is to be fed for a longest length L3 by permitting a third numerical control motor 5*c* to run for t1+t2+t3 minutes. These periods may be determined from the number of rotation of associated motors per unit time and other running characteristics.

After locating the ends S of all wires at the reference position N, all numerical control motors 5*a*, 5*b* and 5*c* are put in operation, thus rotating their gear wheels 7*a*, 7*b* and 7*c* to drive the endless belts 3 around the idler pulleys 2*a*, 2*b*, 2*c* and 2*d*. Accordingly, the guide endless belts 14*a*, 14*b* and 14*c* are driven around idler pulleys 15*a* and 15*b* to feed all wires W1, W2 and W3 forward since these wires are sandwiched between and gripped by the underlying endless belts 3 and the overlying guide belts 14*a*, 14*b* and 14*c*. As seen from FIG. 6, when time t1 has passed, the first numerical control motor 5*a* is stopped, causing the wire W1 to be fed the shortest length L1. The second and third numerical control motors 5*b* and 5*c* continue to run. As seen from FIG. 7, when time t2 has passed, the second numerical control motor 5*b* is stopped, causing the wire W2 to be fed the medium length L2. The remaining third numerical control motor 5*c* is allowed to run continuously until, as seen from FIG. 8, when time t3 has passed, the third numerical control motor 5*c* is stopped, causing the wire W3 to be fed the longest length L3. Thus, the third numerical control motor 5*c* is allowed to run continuously for t1+t2+t3 (=T) until the longest wire length has been measured. Each numerical control motor is allowed to run continuously until the allotted wire length measurement has been completed.

Also, advantageously the numerical control motors 5*a*, 5*b* and 5*c* need not be positioned between adjacent wire measuring units as in the conventional wire measuring apparatus, and accordingly the lateral size of the wire measuring apparatus can be reduced compared with a conventional one.

Figure 9:
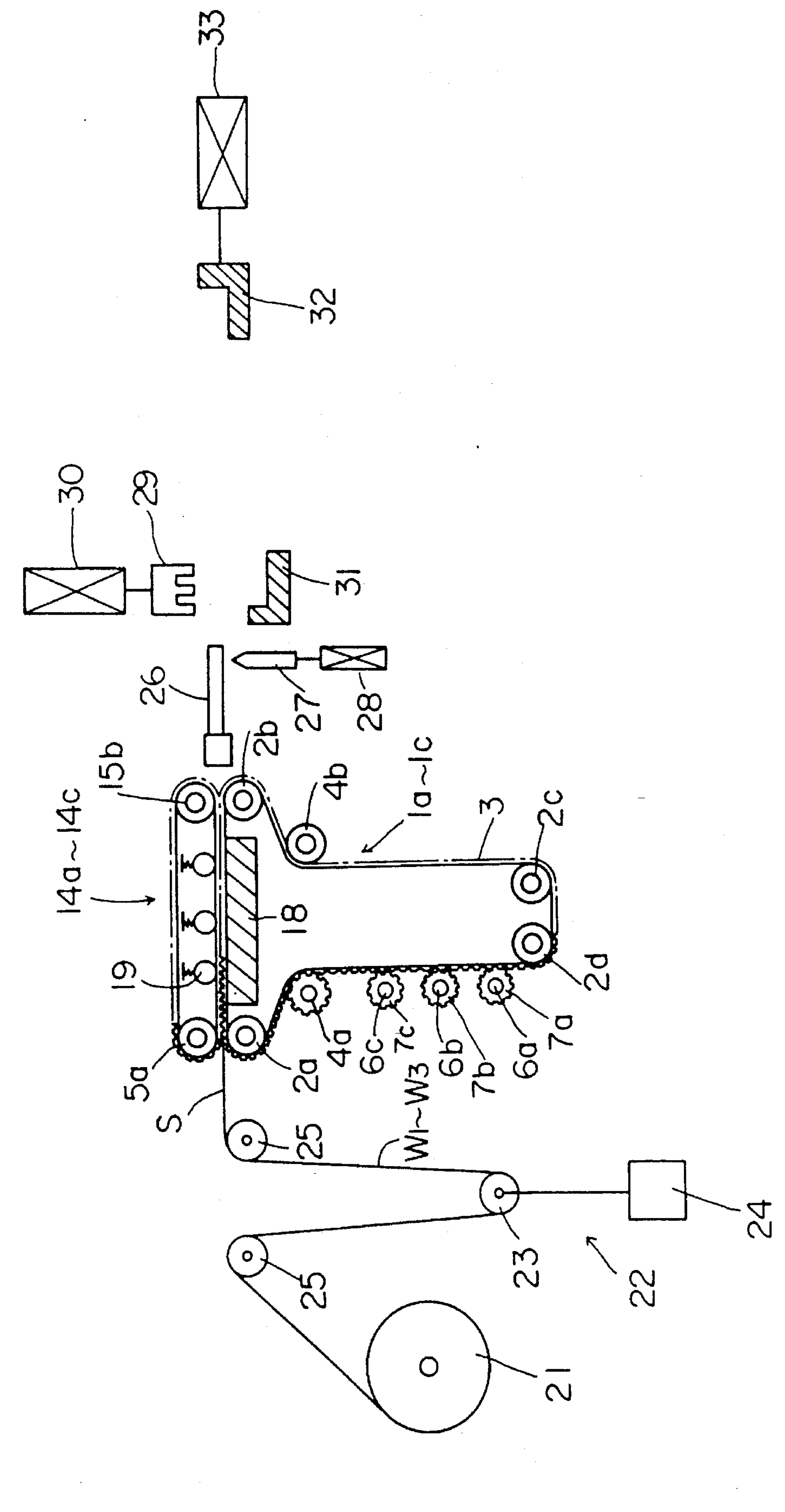
FIG. 9 is a somewhat schematic front view of the multi-wire feeding apparatus associated with an electric connector harness termination unit, showing a first step in fixing an electric connector to the end of a wire arrangement.

Referring to FIGS. 9 to 19, the wire feeding apparatus may be used along with an apparatus for fixing electric connectors to both ends of parallel arrangements of different wire lengths to produce electric harnesses. Referring to FIG. 9, a plurality of wires W1, W2 and W3 are fed from wire rolls 21 to be sandwiched between the endless belts 3 and the guide endless belts 14*a*, 14*b* and 14*c* while being pulled by wire-tensioning means, which comprises tension rolls 23 and associated weights 24. The forward ends S of these wires W1, W2 and W3 are put in aligned position, and are held in position by appropriate means (not shown).

Figure 10:
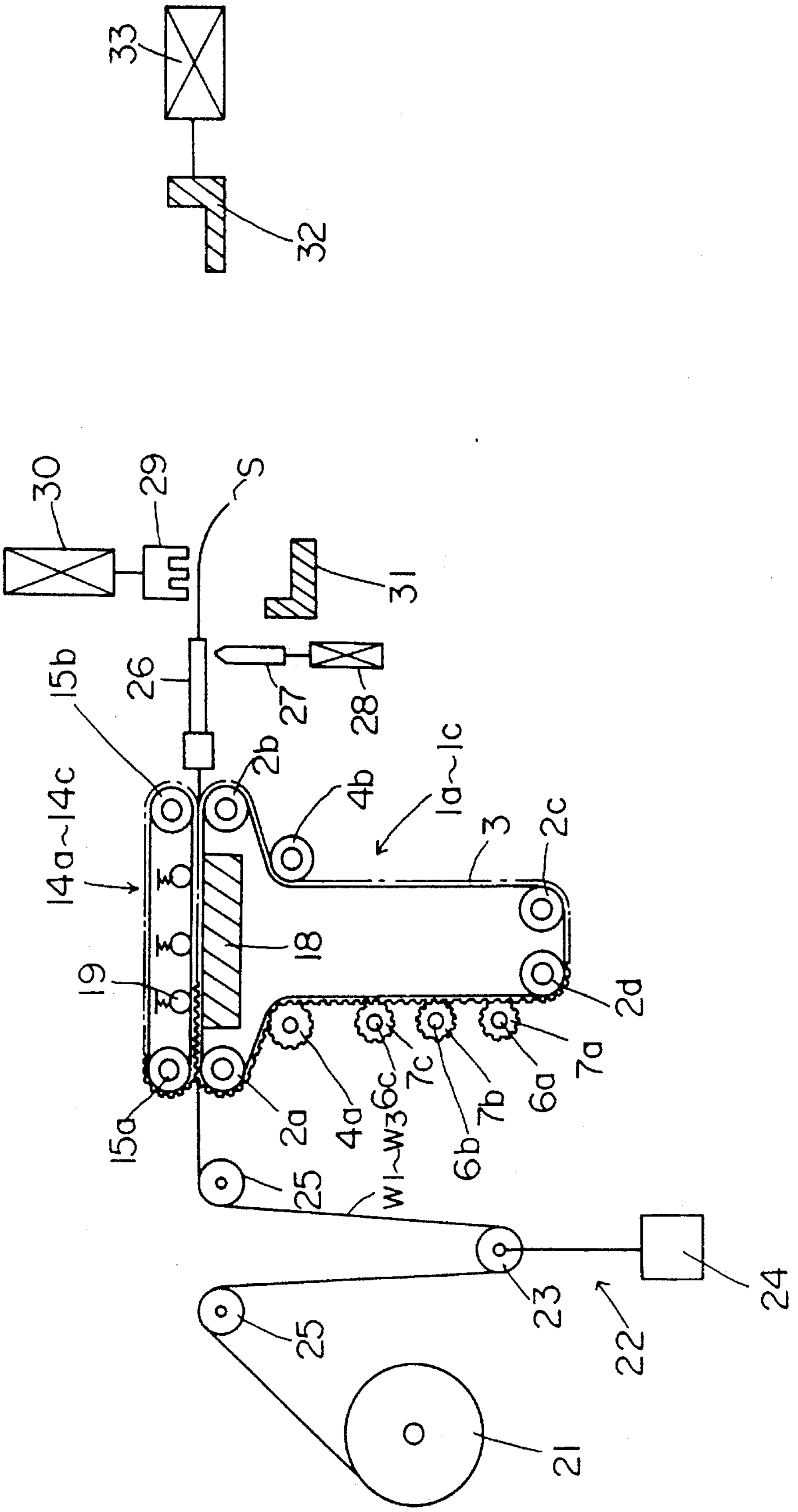
FIG. 10 is a view similar to FIG. 9, but showing a second step in fixing the electric connector to the end of the wire arrangement.

As seen from FIG. 10, all wires W1, W2 and W3 are fed by the wire feeding units 1*a*, 1*b* and 1*c* until the forward ends S of these wires W1, W2 and W3 have passed through a conventional wire-pitch controller 26 to be positioned below a press ram 29.

Figure 11:
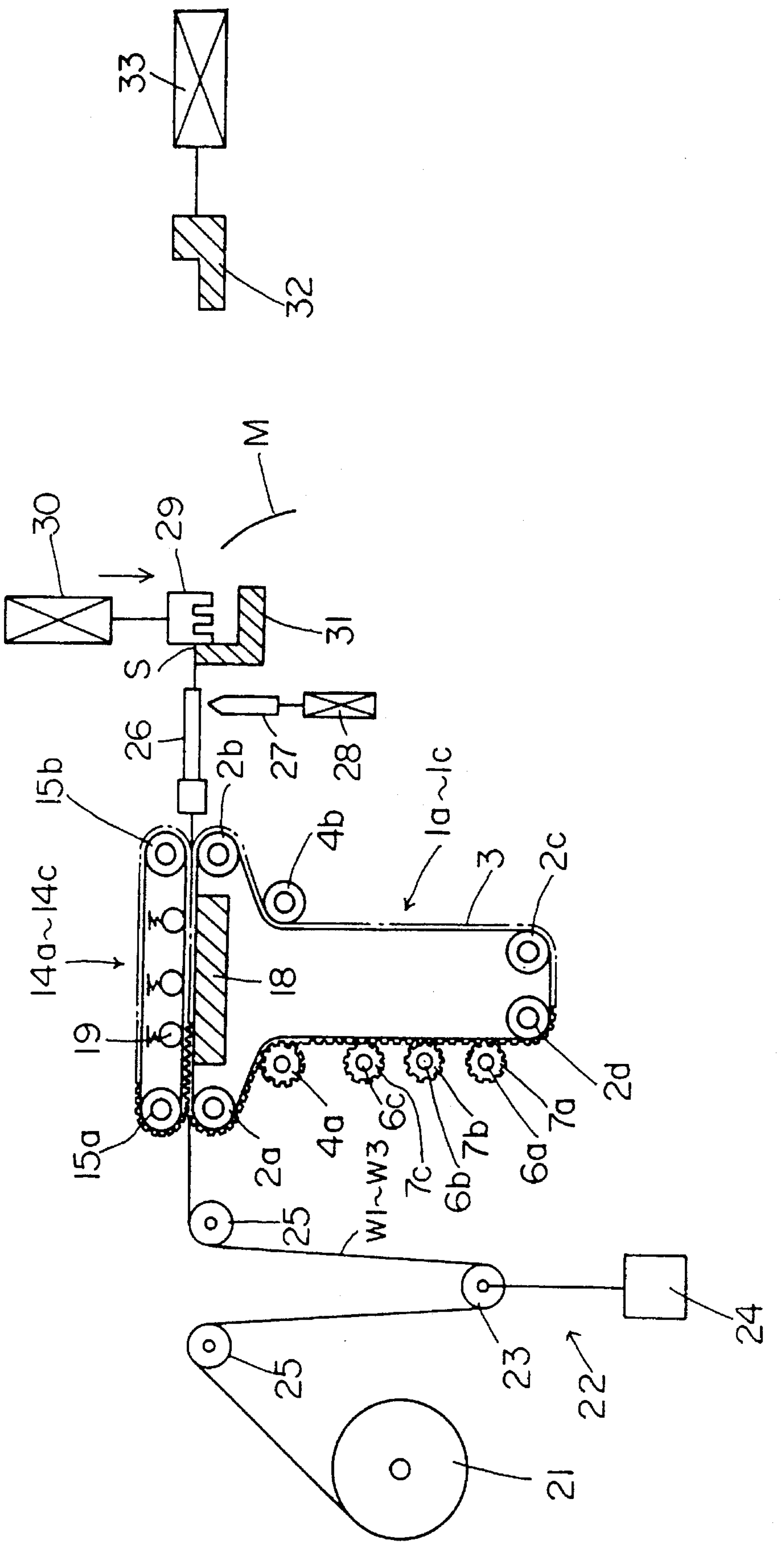
FIG. 11 is a view similar to FIG. 9, but showing a third step in fixing the electric connector to the end of the wire arrangement.
Figure 12:
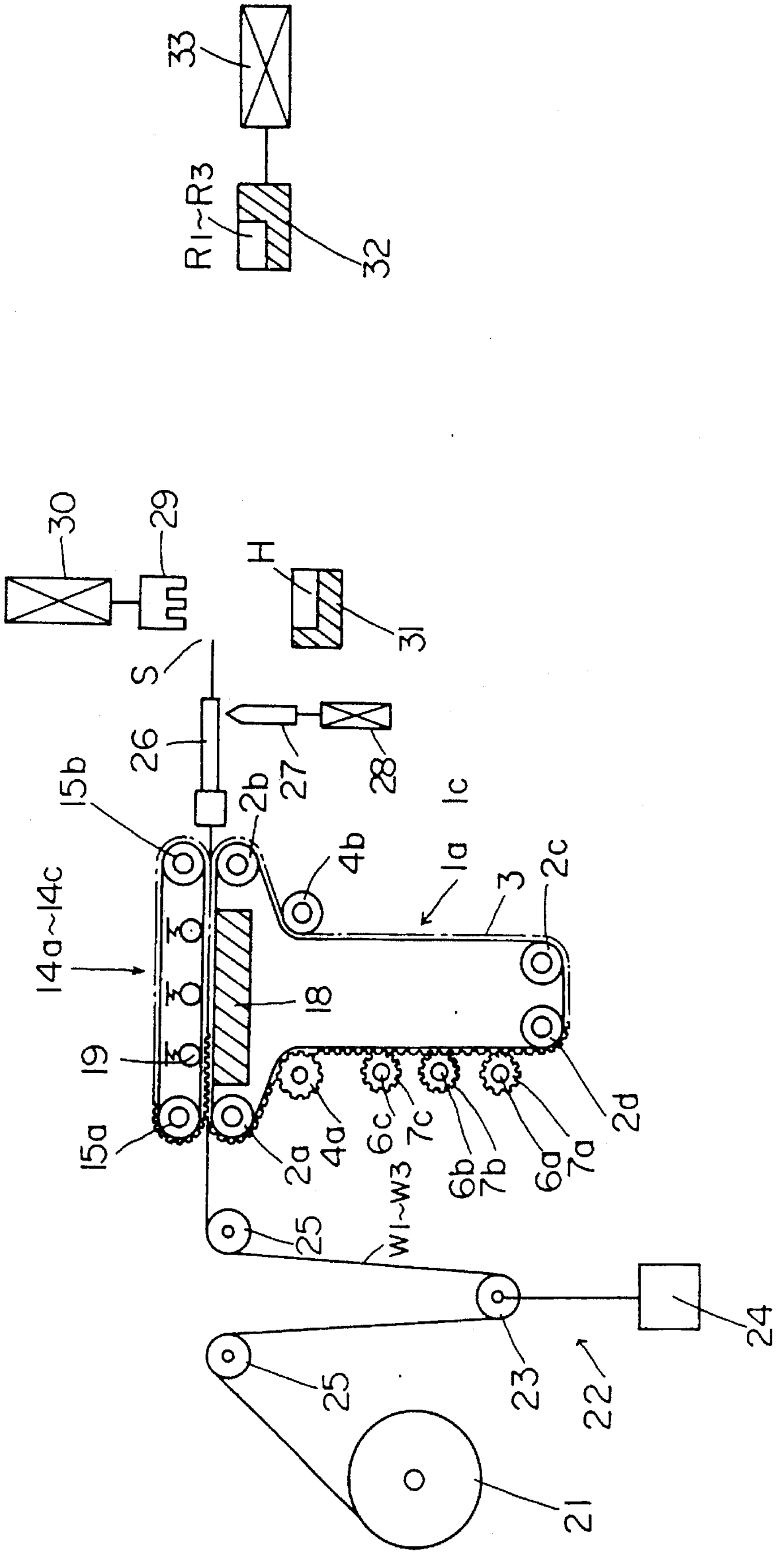
FIG. 12 is a view similar to FIG. 9, but showing a fourth termination step.
Figure 13:
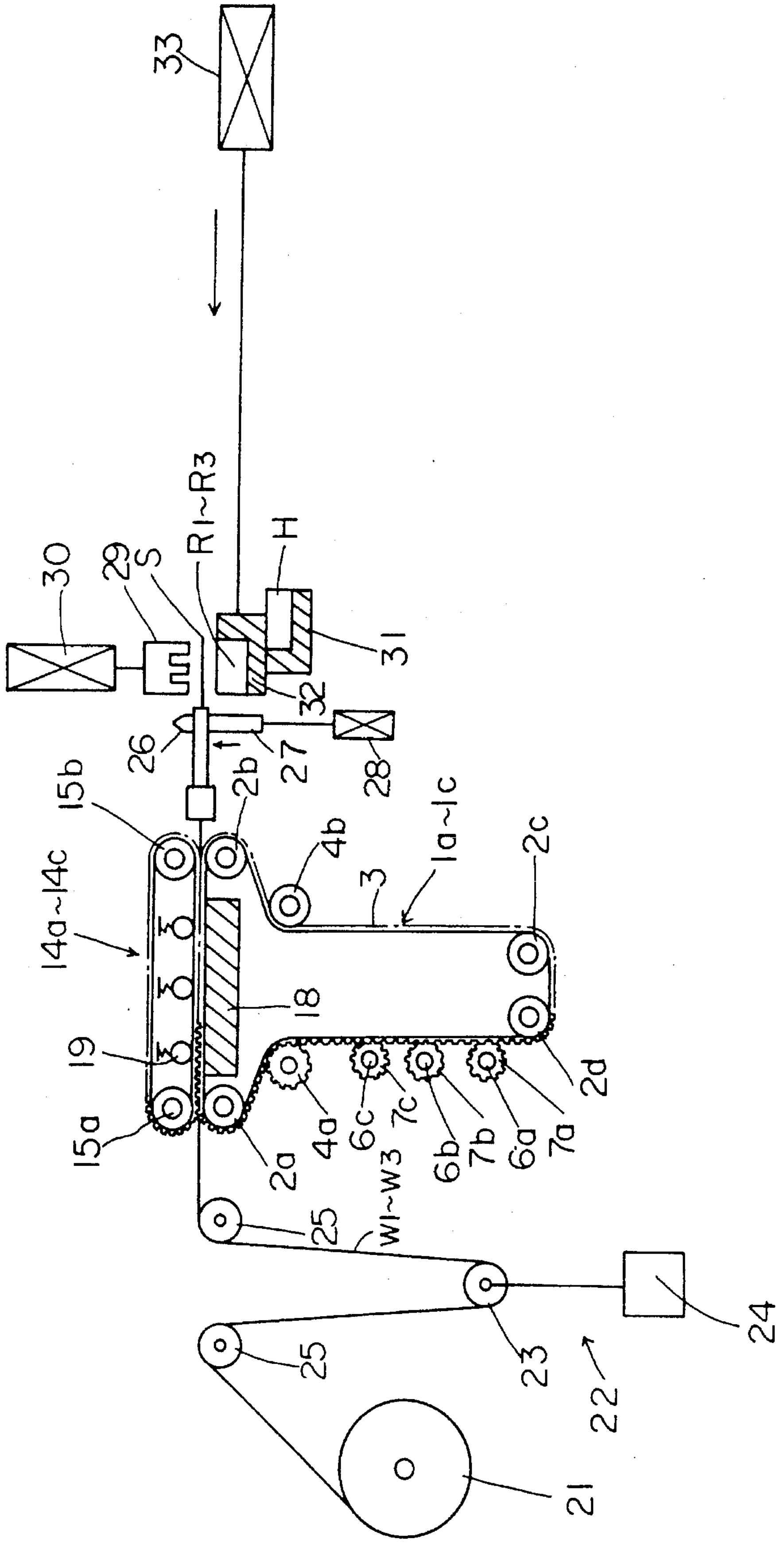
FIG. 13 is a view similar to FIG. 9, but showing a fifth termination step.

As seen from FIG. 11, an associated pneumatic-powered cylinder 30 is actuated to drive the cutter of the press ram 29, thus cutting all wires W1, W2 and W3 to put their ends S in lateral alignment, removing extra wire lengths M for disposal. As seen from FIG. 12, left and right connector beds 31, 32 are loaded with a common connector piece H and individual connector pieces R1, R2 and R3, respectively. As seen from FIG. 13, a first pneumatic-powered cylinder 33 is actuated to bring the right connector bed 32 to the termination position, and at the same time, a second pneumatic-powered cylinder 28 is actuated to raise a comb 27, thereby laterally arranging all wires W1, W2 and W3 at desired intervals.

Figure 14:
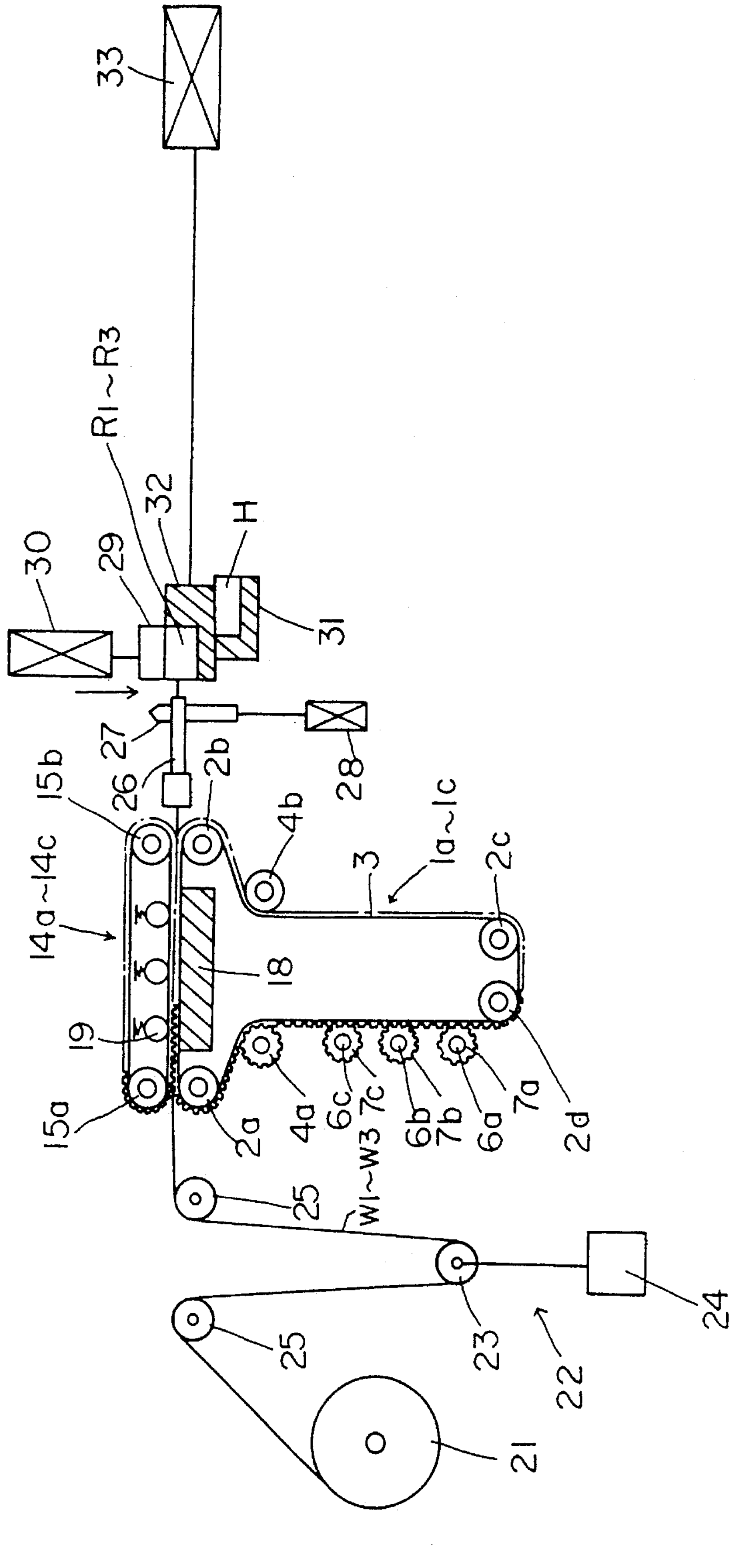
FIG. 14 is a view similar to FIG. 9, but showing a sixth termination step.
Figure 15:
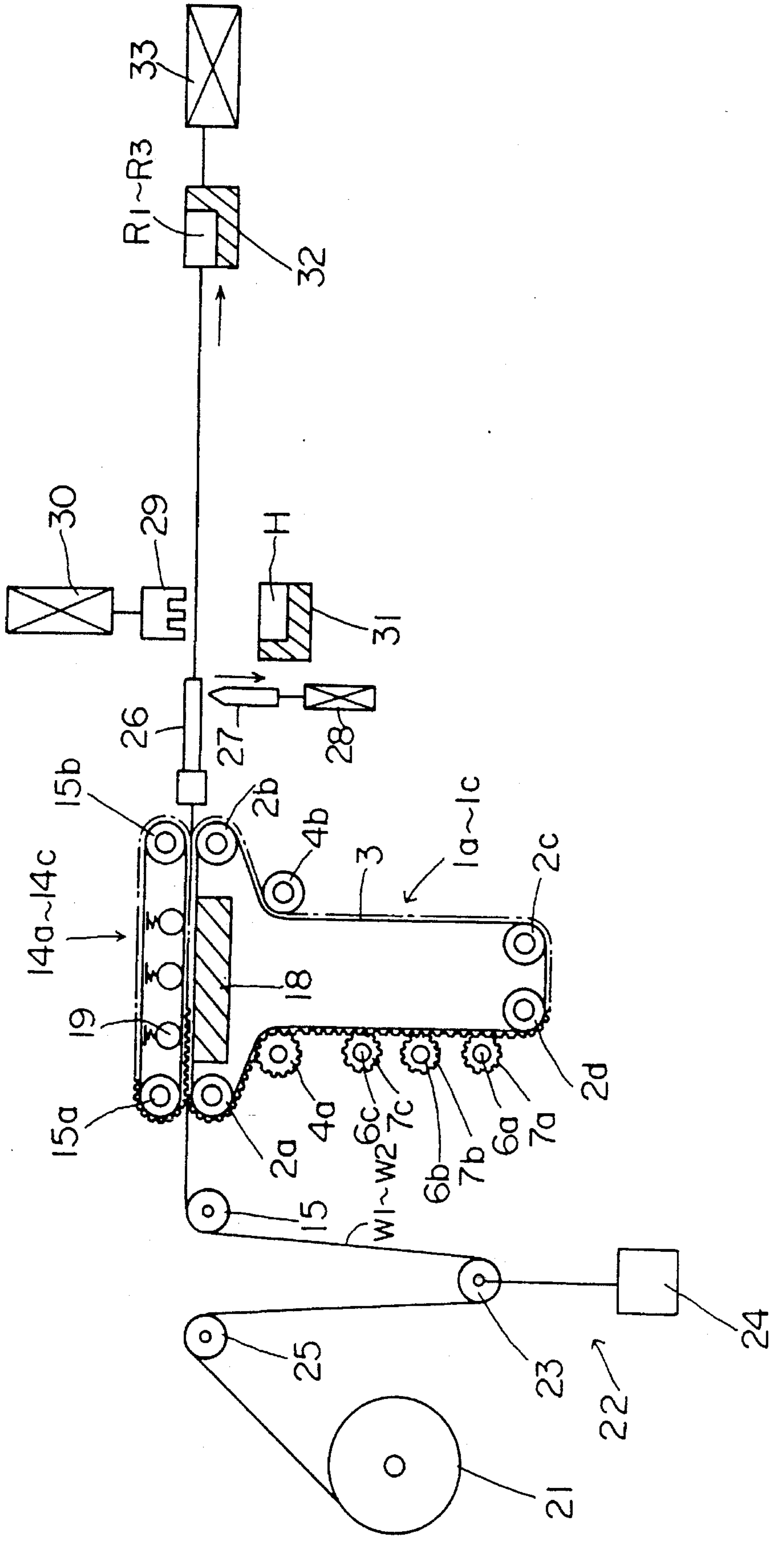
FIG. 15 is a view similar to FIG. 9, but showing a seventh termination step.
Figure 16:
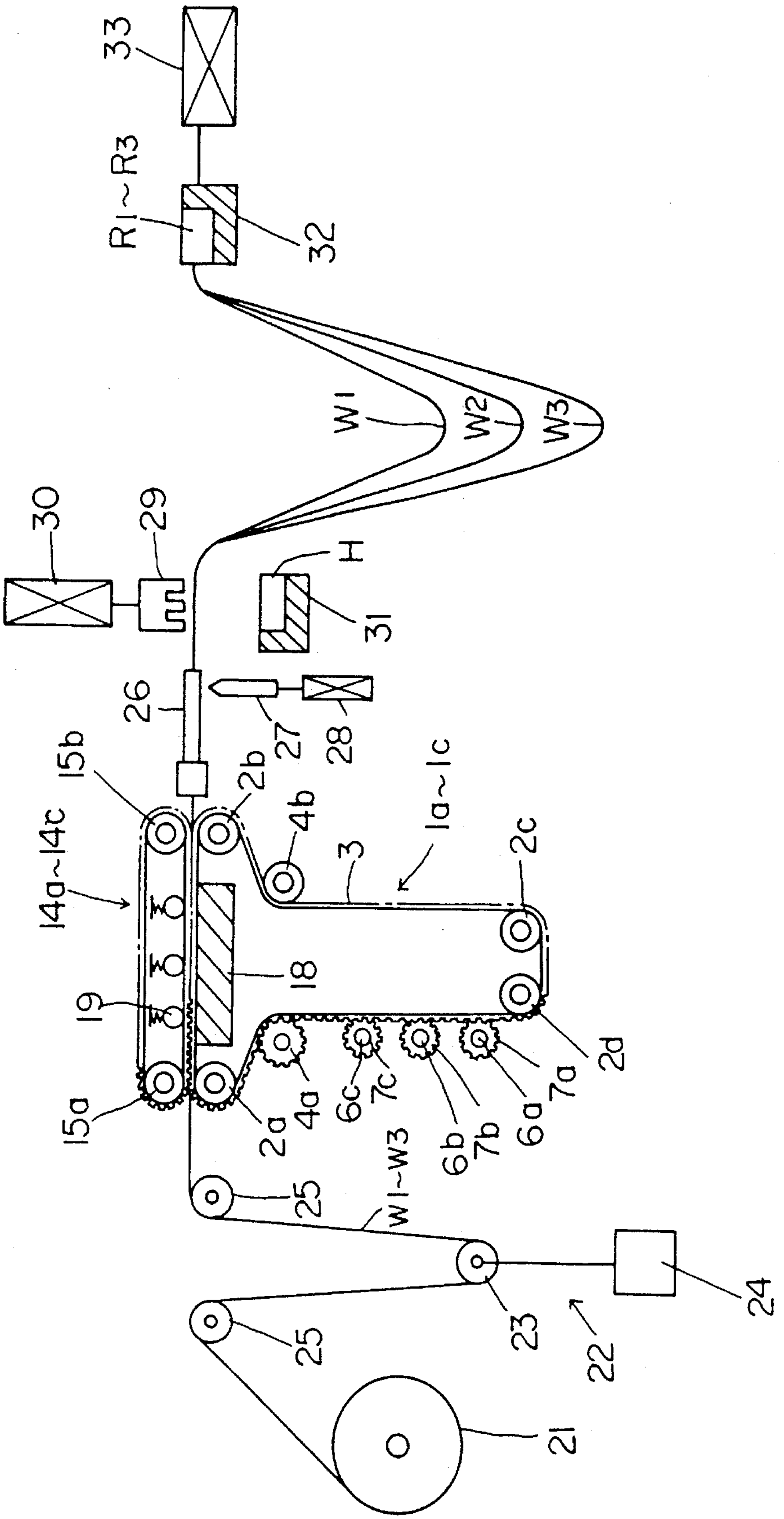
FIG. 16 is a view similar to FIG. 9, but showing an eighth termination step.

As seen from FIG. 14, the pneumatic-powered cylinder 30 is actuated to press the ends of the wires W1, W2 and W3 into the right connector pieces R1, R2 and R3. As seen from FIG. 15, the first pneumatic-powered cylinder 33 is retracted to bring the right connector bed 32 (and the right connectors R1, R2 and R3) to their original position, and at the same time, the pitch-adjusting comb 27 is allowed to return to its original position. As seen from FIG. 16, the wire measuring units 1*a*, 1*b* and 1*c* are driven to measure different wire lengths L1, L2 and L3, which are allowed to loosely hand downward. The manner of feeding the different wire lengths is described above with reference to FIG. 5, 6, 7 and 8.

Figure 17:
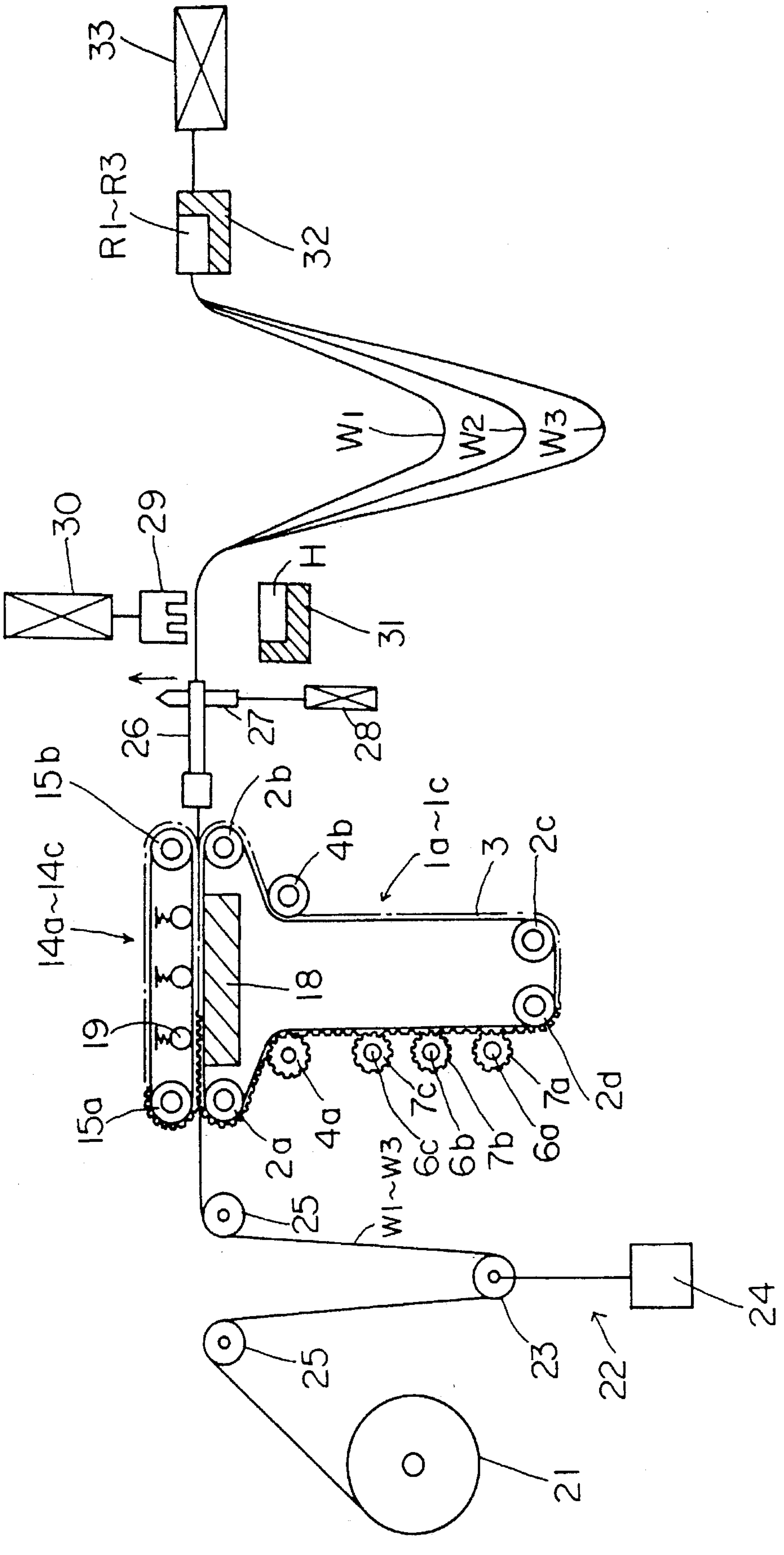
FIG. 17 is a view similar to FIG. 9, but showing a ninth termination step.

As seen from FIG. 17, the pitch-adjusting comb 27 is raised again to arrange parallel wires at the prescribed intervals and left connector bed together with connector H are raised so as to be positioned adjacent the wires.

Figure 18:
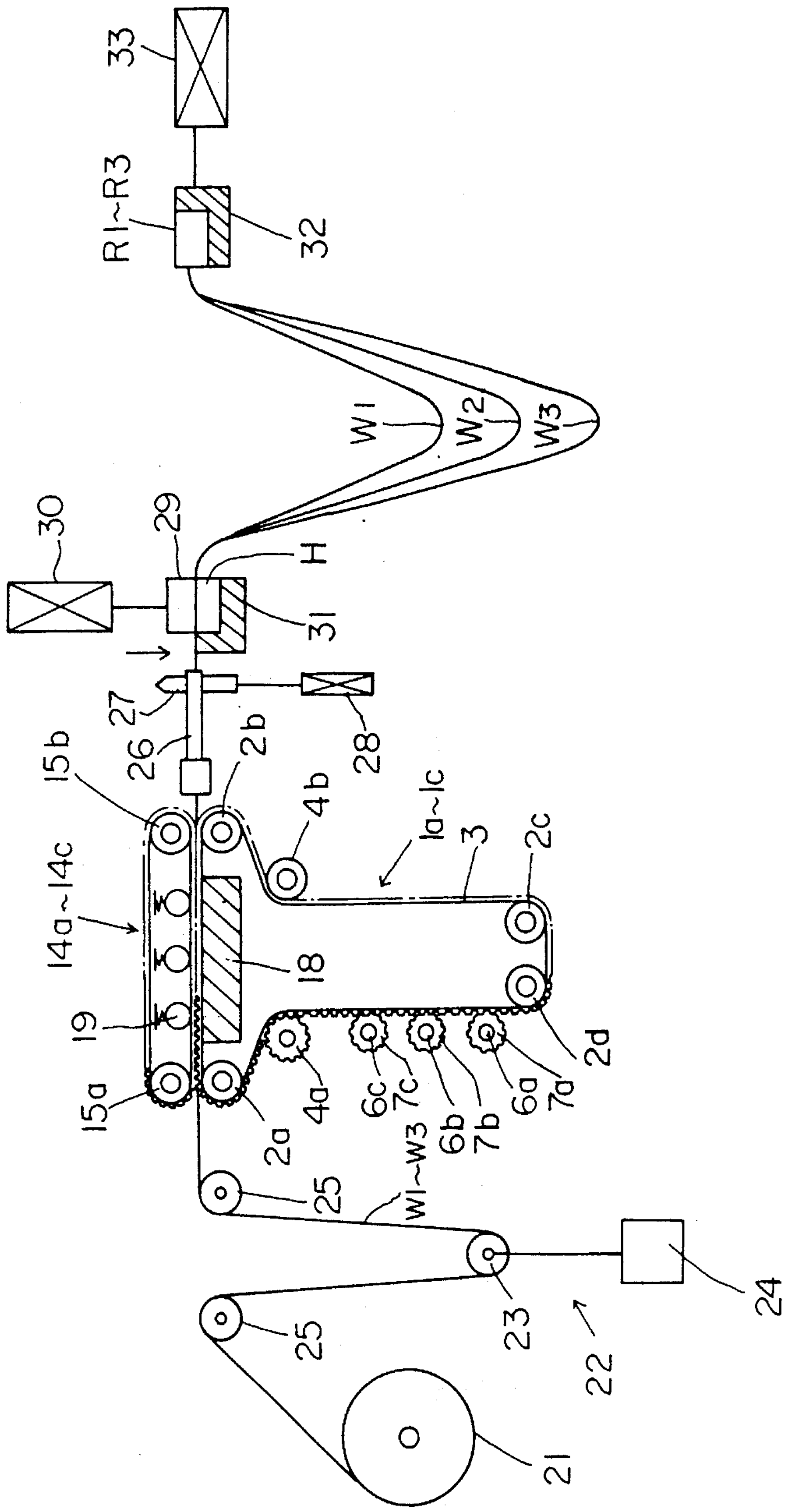
FIG. 18 is a view similar to FIG. 9, but showing a tenth termination step.
Figure 19:
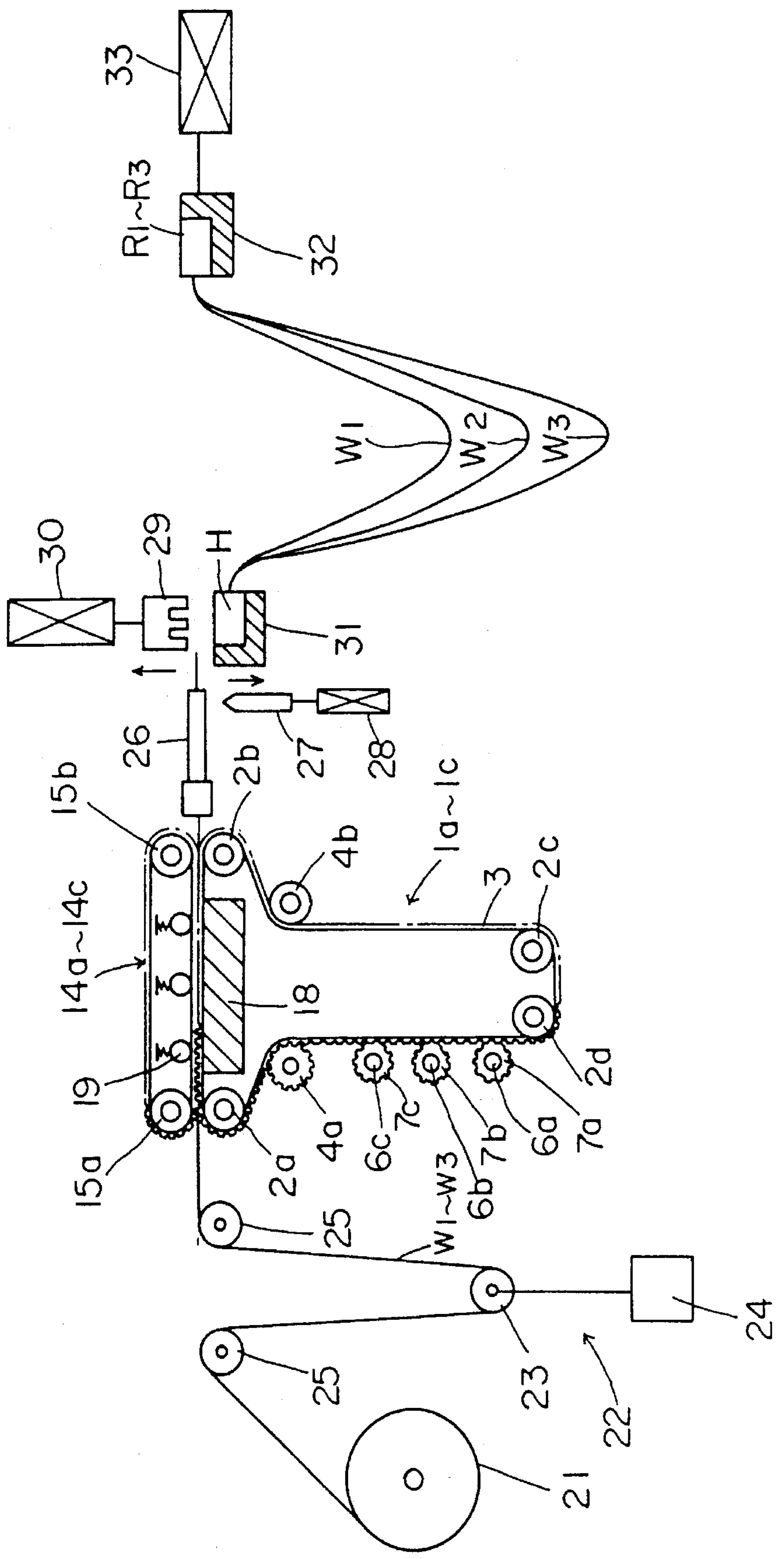
FIG. 19 is a view similar to FIG. 9, but showing an eleventh termination step.
Figure 20:
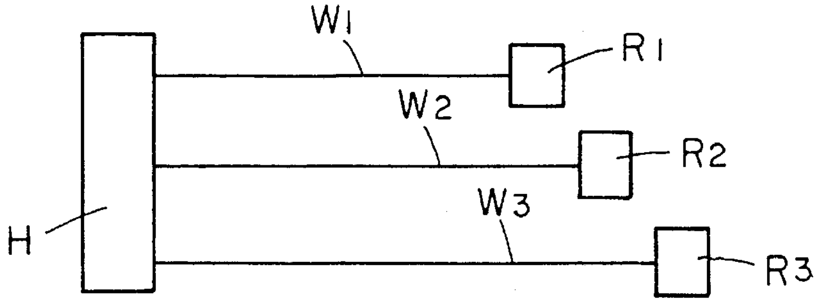
FIG. 20 is a plan view of an electric harness, which is a product produced as a result of sequential steps shown in FIGS. 9 to 19.

As seen from FIG. 18, the pneumatic-powered cylinder 30 is actuated to press the left connector piece H on the left ends of parallel wire lengths to provide an electric harness at the final stage as shown in FIG. 19, in which the electric harness remains in the connector pinching apparatus. The electric harness is shown as parallel different wire lengths W1, W2 and W3 crimped by connectors H and R1, R2 and R3 at their opposite ends in FIG. 20.

Figure 21:
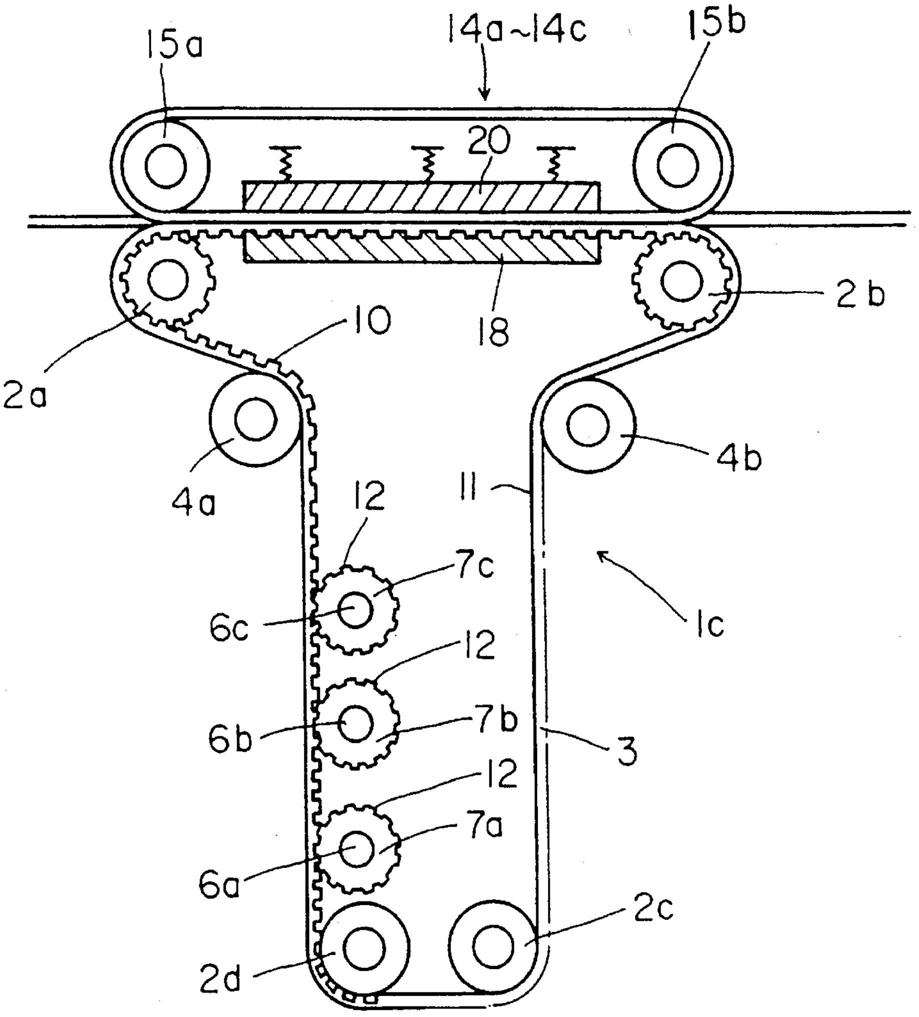
FIG. 21 is a front view of a multi-wire feeding apparatus according to a second embodiment of the present invention.
Figure 22:
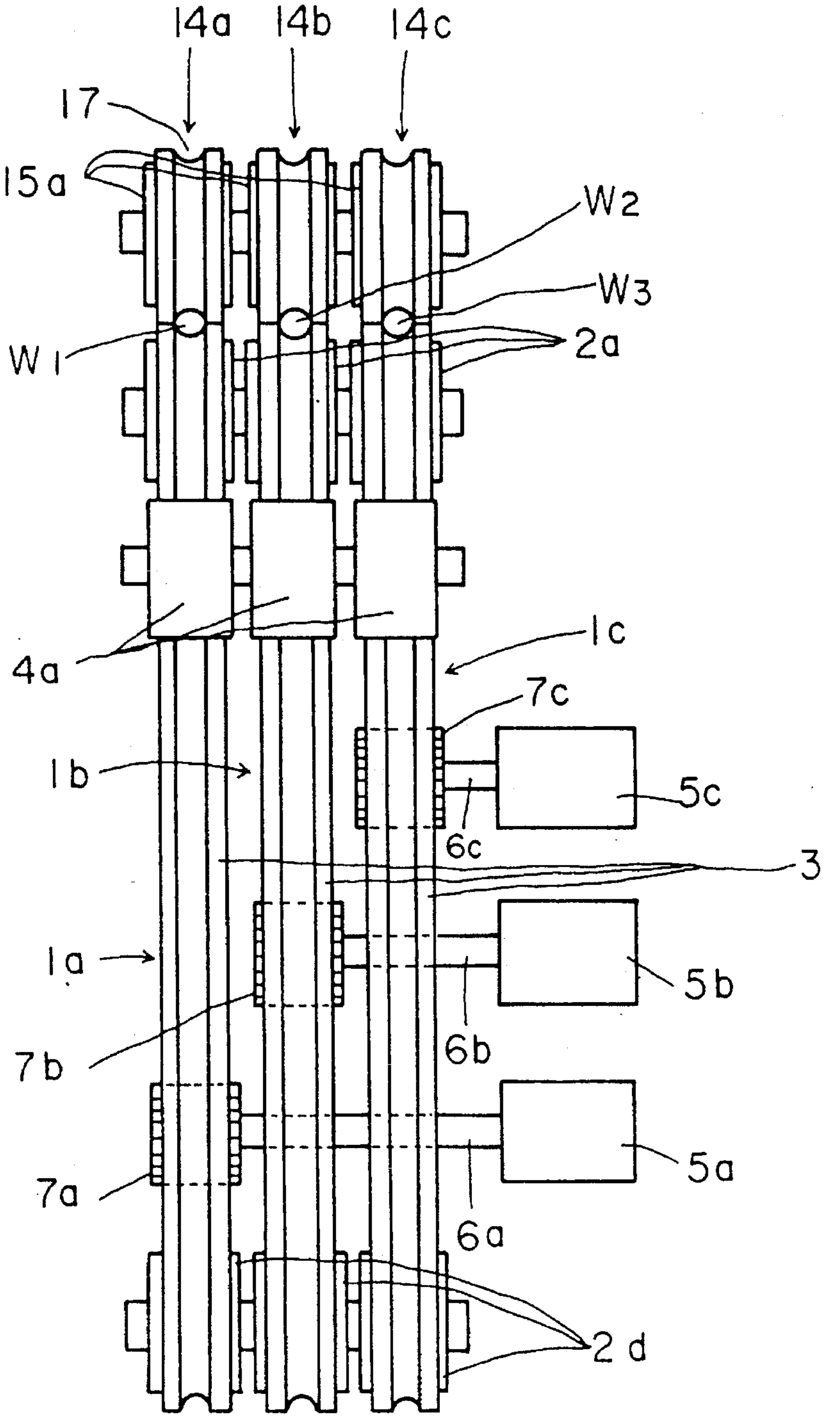
FIG. 22 is a side view of the apparatus as viewed from the left side of FIG. 21.

Referring to FIGS. 21 and 22, a multi-wire feeding apparatus according to a second embodiment of the present invention is shown. Like components are identified by like reference numerals compared to the other embodiments disclosed herein. The second embodiment comprises endless belts 3 each having gear tooth-like projections on its inner side, gear wheels 7*a*, 7*b* and 7*c* arranged in the closed space defined by such endless belts to be applied to the rear-indented surface of the endless belts 3 and gear tooth-free guide belts 14*a*, 14*b* and 14*c* to sandwich a plurality of wires between the endless belts 3 and the counter endless belts 14*a*, 14*b* and 14*c*. As in the first embodiment, the lengths of the endless belts 3 extending between idler pulleys 2*a* and 2*b* are pushed against the overlying guide endless belts 14*a*, 14*b* and 14*c* by the lower linear guide plate 18, whereas the guide endless belts 14*a*, 14*b* and 14*c* are pushed against the underlying endless belts 3 by the upper linear guide plate 20, which is spring-biased.

The multi-wire measuring apparatus of the second embodiment functions in the same way as the first embodiment except for the feeding of wires by the friction between the opposite belt surfaces. Through its configuration, the size of the whole apparatus may be somewhat reduced. If occasions demand, each endless belt 3 may have gear tooth-like projections 10 on its opposite sides, and each guide belt 14*a*, 14*b* or 14*c* may have gear tooth-like projections 16 to engage with the projections of the outer surface of each endless belt 3.

Figure 23:
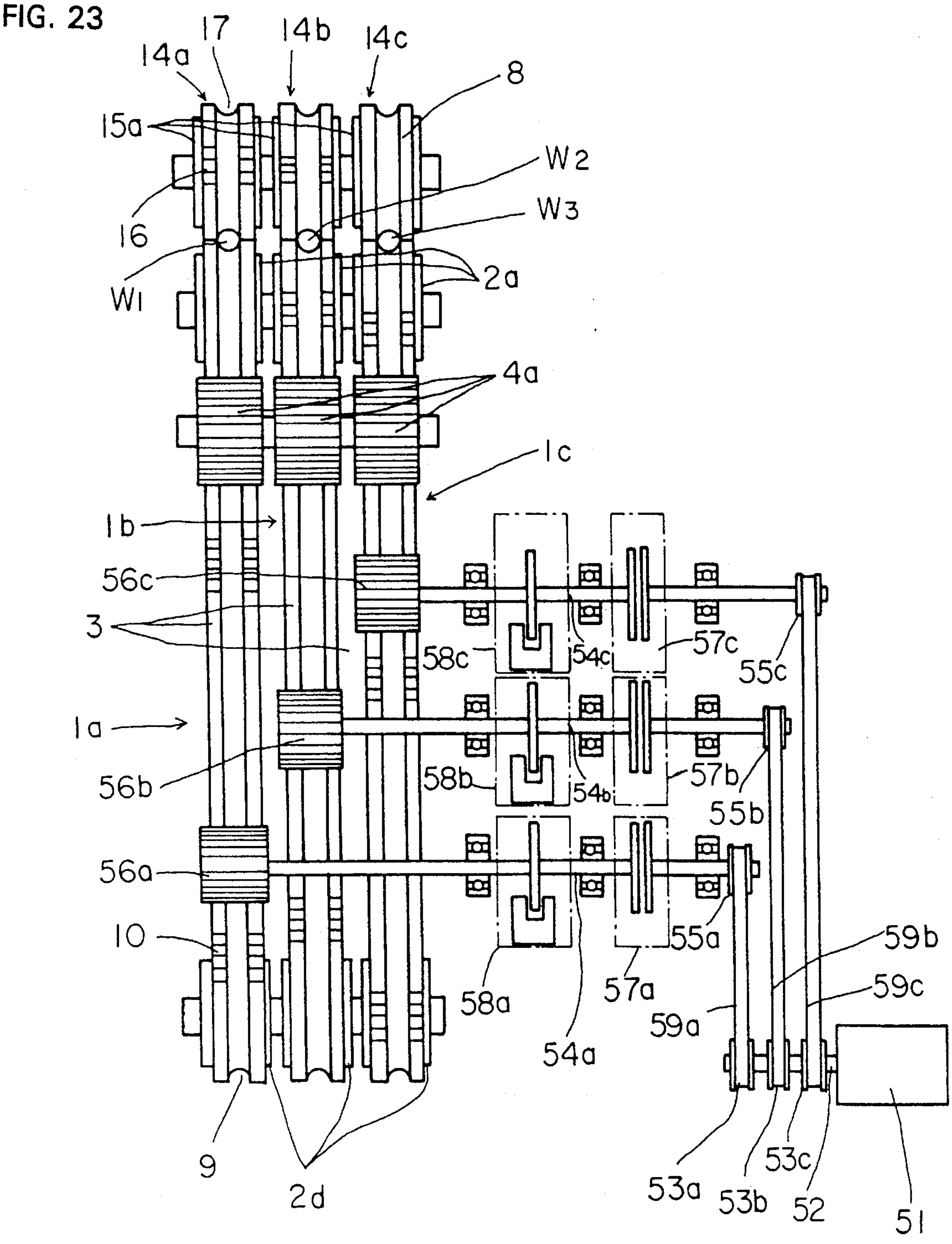
FIG. 23 is a side view of a multi-wire feeding apparatus according to a third embodiment of the present invention.

Referring to FIG. 23, there is shown a multi-wire feeding apparatus according to a third embodiment of the present invention, which uses a single numerical control motor 51 as well as clutches 57 and brakes 58, each associated with each of the wire measuring units 1*a*, 1*b* and 1*c* for transmitting driving power from the single numerical motor 51 to each of the gear wheels 56*a*, 56*b* and 56*c* driving on the endless belts 3 via the clutches 57.

Specifically, the numerical control motor 51 has three drive pulleys 53*a*, 53*b* and 53*c* on its shaft 52. Three transmission axles 54*a*, 54*b* and 54*c* have gear wheels 56*a*, 56*b* and 56*c* and drive pulleys 55*a*, 55*b* and 55*c* fixed to their opposite ends. These transmission axles 54*a*, 54*b* and 54*c* are arranged in a spaced apart, parallel relationship such that their gear wheels 56*a*, 56*b* and 56*c* do not interfere with each other. Transmission belts 59*a*, 59*b* and 59*c* extend between the drive pulleys 53*a*, 53*b* and 53*c* of the motor shaft 52 and the drive pulleys 55*a*, 55*b* and 55*c* of the transmission axles 54*a*, 54*b* and 54*c*. Also, the transmission axles have 54*a*, 54*b* and 54*c* have clutches 57*a*, 57*b* and 57*c* and brakes 58*a*, 58*b* and 58*c* fixed thereto transferring for power from the motor and for stopping the axles.

In operation, the numerical control motor 51 is started, and at the same time, all clutches 57*a*, 57*b* and 57*c* are engaged, and all brakes 58*a*, 58*b* and 58*c* are released. Thus, all gear wheels 56*a*, 56*b* and 56*c* are driven by transmitting power from the motor 51 to the gear wheels 56*a*, 56*b* and 56*c* via the transmission axles 54*a*, 54*b* and 54*c*, and accordingly all of the endless belts 3 are driven. After the lapse of time t1, the clutch 57*a* is released to disconnect the gear wheel 56*a* from the numerical control motor 51, and at the same time, the brake 58*a* is actuated, thereby stopping the gear wheel 56*a* in the wire measuring unit 1*a* to finish the measuring of the wire W1. Likewise, after the lapse of time t2 the clutch 57*b* is released to disconnect the ratchet wheel 56*b* from the numerical control motor 51, and at the same time, the brake 58*b* is actuated, thereby stopping the ratchet wheel 56*b* in the wire measuring unit 1*b* to finish the measuring of the wire W2. Finally after the lapse of time t3, the clutch 57*c* is released, and at the same time, the brake 58*c* is actuated to stop the gear wheel 56*c* in the wire measuring unit 1*c* to finish the measuring of the wire W3.

The numerical control motor is allowed to run continuously until all wire length measurements have been completed, not requiring that every time a selected wire-measurements has been finished the other longer wire-measurements are interrupted as is the case with the conventional wire measuring apparatus. Accordingly the efficiency with which the wire measuring apparatus works is substantially improved. Also, advantageously all clutches and brakes need not be placed between adjacent wire measuring units as in the conventional wire measuring apparatus, and accordingly the lateral size of the wire measuring apparatus can be reduced.

Figure 24:
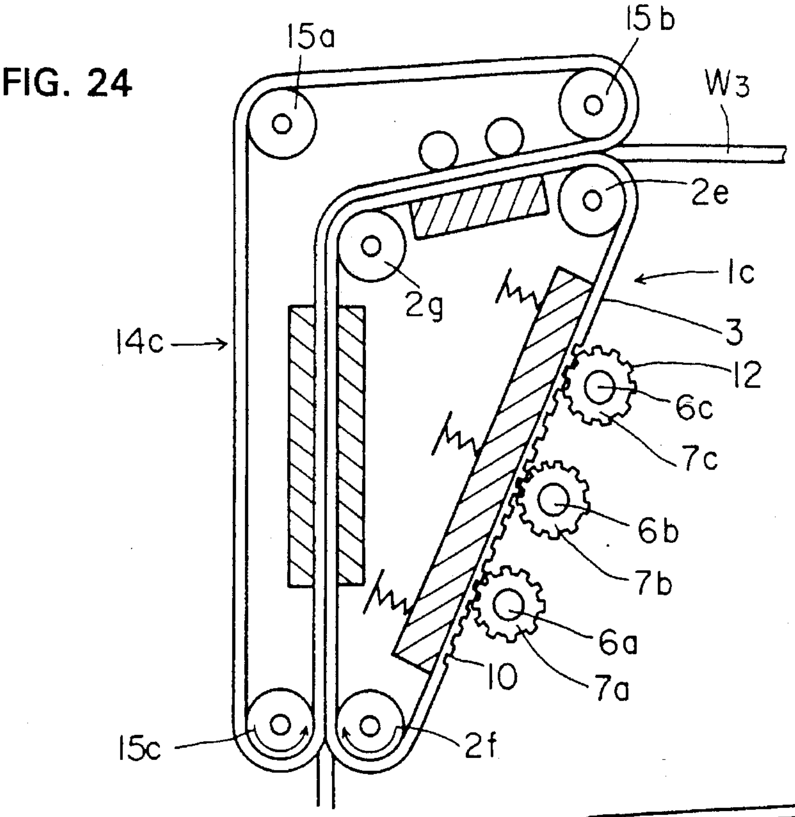
FIG. 24 is a front view of a multi-wire feeding apparatus according to a fourth embodiment of the present invention.
Figure 25:
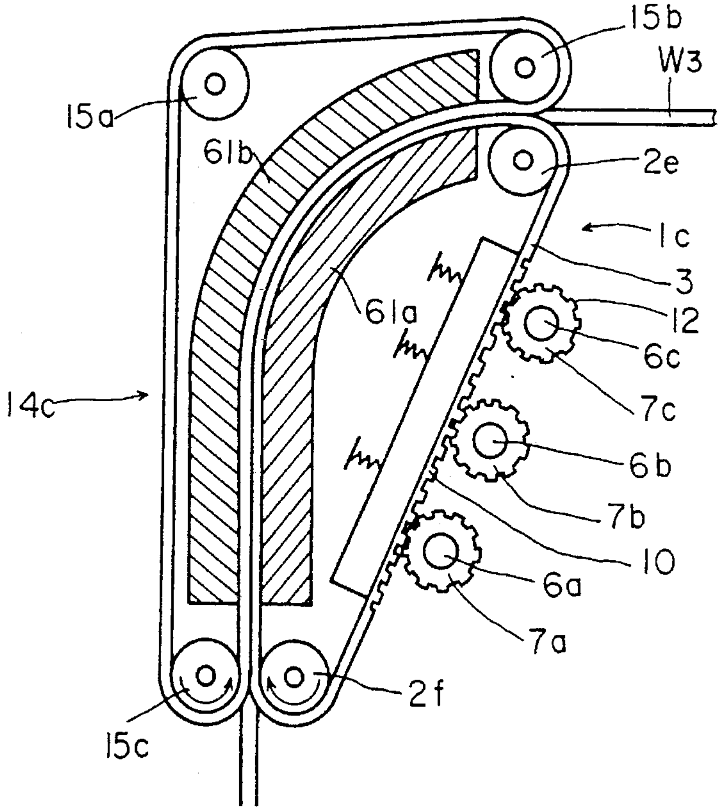
FIG. 25 is a front view of a multi-wire feeding apparatus according to a fifth embodiment of the present invention.
Figure 26:
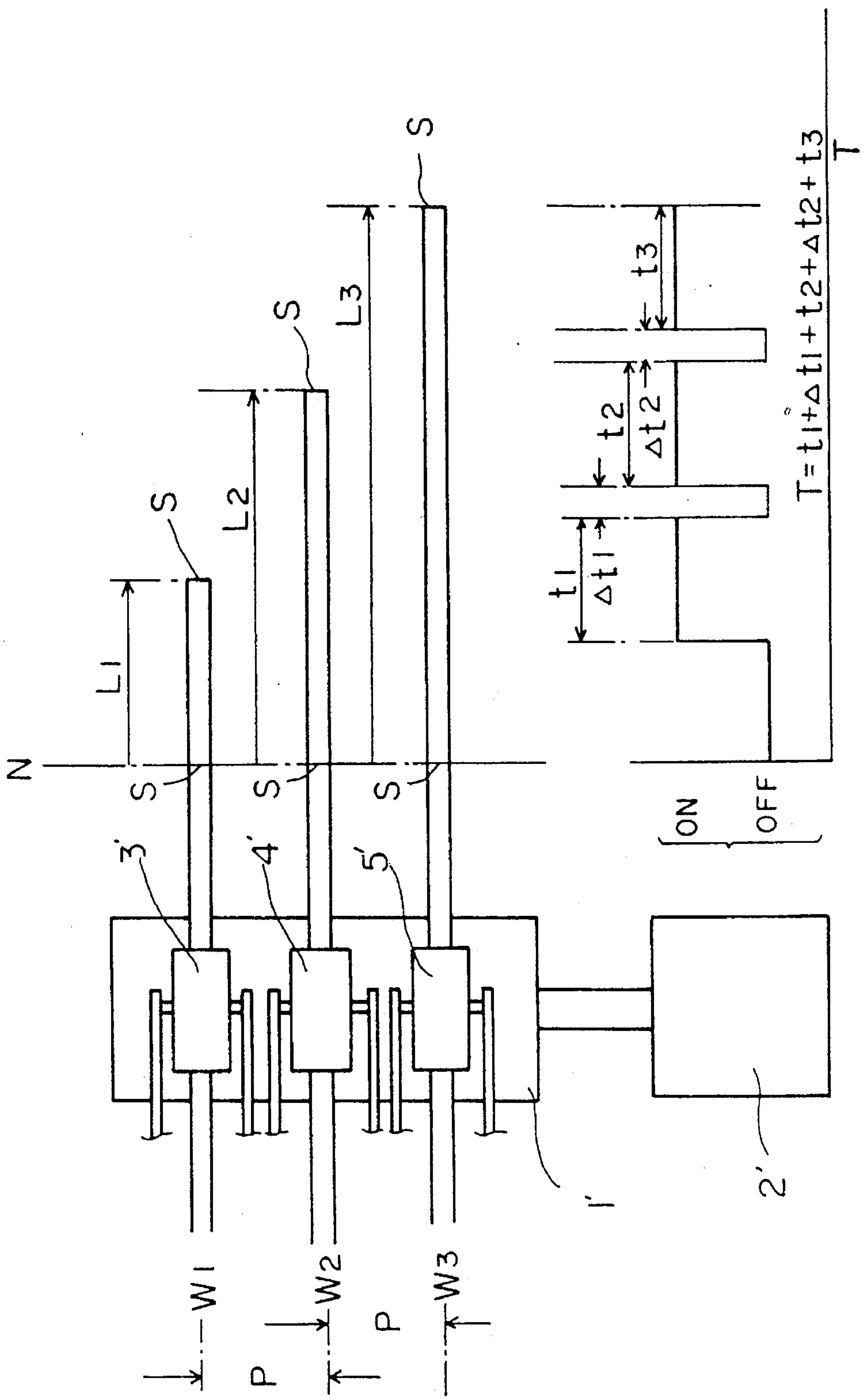
FIG. 26 (Prior Art)
FIG. 26 is a plan view of a conventional prior art multi-wire feeding apparatus.

In all embodiments described above, the wires are fed horizontally to be inserted between the feeding and guide belts. In the alternative, wires W1, W2 and W3 may be fed along a vertical-and-horizontal path as is shown in FIG. 24. Wires W1, W2 and W3 may also be fed along a curved path as shown in FIG. 25. Such curved path may be defined by using curved guide plates 61*a* and 61*b*, which are placed to be applied to the rear surfaces of the feeding belts 3 and guide belts 14.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. A multi-wire feeding apparatus for feeding a plurality of individual wires, each wire having a center electrically conductive portion and an outer insulative portion surrounding said center portion, said apparatus including a plurality of wire feeding units, each unit comprising:

drive means for engaging one of said wires generally on a first side thereof;

pressure means for engaging said one of said wires generally on a second side opposite said first side;

motor means for driving said drive means to feed said one of said wires between said drive means and said pressure means;

said drive means and said pressure means including endless belts, said drive means including a plurality of projections extending from an outer periphery thereof along the length thereof; and said motor means including an engagement member having a plurality of projections thereon for interengagement with the projections of said drive means outside said endless belt to drive said drive means to feed one of said wires.

2. The multi-wire feeding apparatus of claim 1 wherein said endless belt of said drive means is reeved around a plurality of stationary pulleys.

3. The multi-wire feeding apparatus of claim 1, wherein said motor means of each unit is a computer controlled motor.

4. The multi-wire feeding apparatus of claim 1, wherein said drive means engages said one of said wires along a wire feeding path and further comprising a support member along said wire feeding path and against which said drive means is forced, and at least one push member along said wire feeding path for engaging said pressure means and forcing said pressure means towards said drive means.

5. The multi-wire feeding apparatus of claim 1 wherein said pressure means also includes a plurality of projections extending therefrom for interengagement with said projections of said drive means.

6. The multi-wire feeding apparatus of claim 1, wherein said endless belt of said drive means includes a central longitudinal groove along the periphery thereof for engaging said one of said wires.

7. The multi-wire feeding apparatus of claim 6, wherein said endless belt of said drive means includes projections along opposite sides of said central longitudinal groove.

8. The multi-wire feeding apparatus of claim 6, wherein said endless belt of said pressure means includes a central longitudinal groove along the periphery thereof for engaging said one of said wires.

9. The multi-wire feeding apparatus of claim 8, wherein said central longitudinal grooves of said endless belts of said drive means and said pressure means form a generally cylindrical opening along said wire feeding path to grip said one of said wires during feeding thereof.

10. The multi-wire feeding apparatus of claim 1, wherein said motor means of each unit is a computer controlled motor.

11. The multi-wire feeding apparatus of claim 10, wherein said engagement member and said motor rotate about a common axis.

12. The multi-wire feeding apparatus of claim 1, wherein said motor means collectively comprise a single, computer controlled motor, said motor being operatively connected to a plurality of transmission shaft means, each transmission shaft means having one of said engagement members operatively connected thereto, a clutch for intermittently transferring power from said motor to said engagement member and a brake for intermittently stopping said engagement member.

13. The multi-wire feeding apparatus of claim 1, further comprising a backing member positioned adjacent said engagement members to form a passage through which said drive means passes.

14. The multi-wire feeding apparatus of claim 3, wherein said engagement member and said motor rotate about a common axis.

15. The multi-wire feeding apparatus of claim 1, further a backing member positioned adjacent said engagement members to form a passage through which said drive means passes.

16. A multi-wire feeding apparatus for feeding a plurality of individual wires, each wire having a center electrically conductive portion and an outer insulative portion surrounding said center portion, said apparatus including a plurality of wire feeding units, each unit comprising:

drive means for engaging one of said wires generally on a first side thereof along a wire feeding path, said drive means being reeved around a plurality of stationary pulleys;

pressure means for engaging said one of said wires generally on a second side opposite said first side;

motor means for driving said drive means to feed said one of said wires between said drive means and said pressure means;

said drive means and said pressure means including endless belts, said drive means including a plurality of projections extending from an inner periphery thereof along the length thereof;

said motor means including an engagement member having a plurality of projections thereon for interengagement with the projections of said drive means inside said endless belt to drive said means to feed one of said wires; and a support member along said wire feeding path and against which said drive means is forced, and at least one push member along said wire feeding path for engaging said pressure means and forcing said pressure means towards said drive means.

17. A multi-wire feeding apparatus for feeding a plurality of individual wires, each wire having a center electrically conductive portion and an outer insulative portion surrounding said center portion, said apparatus including a plurality of wire feeding units, each unit comprising:

drive means for engaging one of said wires generally on a first side thereof;

pressure means for engaging said one of said wires generally on a second side opposite said first side;

motor means for driving said drive means to feed said one of said wires between said drive means and said pressure means;

said drive means and said pressure means including endless belts, said drive means further including a plurality of projections extending therefrom along the length thereof together with a central longitudinal groove along the periphery of the drive means and dimensioned for engaging said one of said wires; and said motor means including an engagement member having a plurality of projections thereon for interengagement with the projections of said drive means to drive said drive means to feed one of said wires.

18. The multi-wire feeding apparatus of claim 17, wherein said endless belt of said drive means includes projections along opposite sides of said central longitudinal groove.

19. The multi-wire feeding apparatus of claim 17, wherein said pressure means includes a central longitudinal groove along the periphery thereof for engaging said one of said wires.

20. The multi-wire feeding apparatus of claim 19, wherein said central longitudinal grooves of said drive means and said pressure means form a generally cylindrical opening along said wire feeding path to grip said one of said wires during feeding thereof.

21. In a multi-wire feeding apparatus for feeding a plurality of individual wires, each wire having a center electrically conductive portion and an outer insulative portion surrounding said center portion, said apparatus comprising:

a plurality of wire feeding units, each unit including drive means for engaging one of said wires generally on a first side thereof;

pressure means for engaging said one of said wires generally on a second side opposite said first side;

said drive means and said pressure means including endless belts, said drive means including a plurality of projections extending therefrom along the length thereof; and motor means for driving said drive means to feed said one of said wires between said drive means and said pressure means, said motor means including an engagement member having plurality of projections thereon for interengagement with the projections of said drive means to drive said drive means to feed one of said wires;

said motor means collectively comprising a single, computer controlled motor, said motor being operatively connected to a plurality of transmission shaft means, each transmission shaft means having one of said engagement members operatively connected thereto, a clutch for intermittently transferring power from said motor to said engagement member and a brake for intermittently stopping said engagement member.

* * * * *